(12) United States Patent
Green et al.

(10) Patent No.: US 8,984,094 B2
(45) Date of Patent: Mar. 17, 2015

(54) SYSTEMS AND METHODS TO DELIVER A PERSONALIZED MEDIACAST

(71) Applicant: Abacast, Inc., Vancouver, WA (US)

(72) Inventors: Robert D. Green, Seattle, WA (US);
James M. Kott, Kirkland, WA (US);
John W. Morris, IV, Washougal, WA (US); Brian S. Bosworth, Edgewater, MD (US)

(73) Assignee: Wideorbit Inc., San Francisco, CA (US)

( * ) Notice: Subject to any disclaimer, the term of this patent is extended or adjusted under 35 U.S.C. 154(b) by 267 days.

(21) Appl. No.: 13/711,984

(22) Filed: Dec. 12, 2012

(65) Prior Publication Data

US 2013/0246567 A1 Sep. 19, 2013

Related U.S. Application Data

(60) Provisional application No. 61/611,403, filed on Mar. 15, 2012.

(51) Int. Cl.
*G06F 15/16* (2006.01)
*H04L 29/08* (2006.01)
*H04L 29/06* (2006.01)
*H04L 12/18* (2006.01)

(52) U.S. Cl.
CPC ................ *H04L 67/32* (2013.01); *H04L 67/06* (2013.01); *H04L 67/325* (2013.01); *H04L 65/602* (2013.01); *H04L 12/1859* (2013.01)
USPC ................. 709/217; 725/32; 725/34; 725/40; 725/44; 705/14.4; 705/14.73; 709/203; 709/218; 709/231

(58) Field of Classification Search
USPC .......................................................... 709/217
See application file for complete search history.

(56) References Cited

U.S. PATENT DOCUMENTS

| 6,487,721 B1 | 11/2002 | Safadi |
| 6,577,716 B1 | 6/2003 | Minter et al. |
| 7,412,714 B2 | 8/2008 | Kitayama |

(Continued)

OTHER PUBLICATIONS

Green et al., "Systems, Methods and Articles to Automatically Expose and Place Material in Streams of Programming," Office Action mailed May 14, 2014, for U.S. Appl. No. 13/679,828, 49 pages.

(Continued)

*Primary Examiner* — Tauqir Hussain
(74) *Attorney, Agent, or Firm* — Seed IP Law Group PLLC

(57) ABSTRACT

Content delivery is provided responsive to mediacast content consumer requests by providing personalized mediacasts to each of a plurality of mediacast content consumers. Each of the personalized mediacasts includes a variety of replaceable programming and non-programming content segments and a variety of non-replaceable programming and non-programming content segments. Replacement programming and non-programming content segments may be targeted, for example selected based in part on one or more selection criterion associated with the mediacast content consumer, or provided by the broadcaster or Webcaster. A buffering scheme may be employed to inherently adjust asynchronicity between a broadcast or Webcast and a personalized mediacast. Actual insertion of replacement programming and non-programming content segments may occur upstream of a content consumer device or at the content consumer device.

25 Claims, 5 Drawing Sheets

(56) References Cited

U.S. PATENT DOCUMENTS

| | | | |
|---|---|---|---|
| 7,676,405 | B2 | 3/2010 | Steelberg et al. |
| 7,752,642 | B2 | 7/2010 | Lemmons |
| 8,230,037 | B2 * | 7/2012 | Story et al. .................... 709/217 |
| 8,381,244 | B2 | 2/2013 | King et al. |
| 8,812,637 | B2 * | 8/2014 | Cragun et al. ................. 709/223 |
| 2001/0023498 | A1 * | 9/2001 | Cosmao et al. ................. 725/32 |
| 2002/0078443 | A1 | 6/2002 | Gadkari et al. |
| 2003/0033157 | A1 | 2/2003 | Dempski et al. |
| 2003/0188320 | A1 | 10/2003 | Shing |
| 2004/0025176 | A1 | 2/2004 | Franklin et al. |
| 2004/0128682 | A1 * | 7/2004 | Liga et al. ....................... 725/35 |
| 2004/0133467 | A1 * | 7/2004 | Siler ............................... 705/14 |
| 2007/0074243 | A1 * | 3/2007 | Verhaegh et al. ............... 725/32 |
| 2007/0220411 | A1 * | 9/2007 | Hauser ........................... 715/500 |
| 2009/0031037 | A1 | 1/2009 | Mendell et al. |
| 2010/0269138 | A1 | 10/2010 | Krikorian et al. |
| 2010/0280889 | A1 | 11/2010 | Gabriel et al. |
| 2010/0293046 | A1 | 11/2010 | Cooke et al. |
| 2013/0132997 | A1 | 5/2013 | King et al. |
| 2013/0144723 | A1 | 6/2013 | Green et al. |
| 2013/0198328 | A1 | 8/2013 | Green et al. |
| 2013/0282495 | A1 | 10/2013 | Gilbane et al. |
| 2014/0068648 | A1 | 3/2014 | Green et al. |

OTHER PUBLICATIONS

Green et al., "Systems and Methods to Deliver a Personalized Mediacast," U.S. Appl. No. 61/611,403, filed Mar. 15, 2012, 75 pages.

Green et al., "Systems and Methods to Deliver a Personalized Mediacast With an Uninterrupted Lead-In Portion," U.S. Appl. No. 61/877,182, filed Sep. 12, 2013, 171 pages.

Green et al., "Systems, Methods and Articles to Automatically Expose and Place Material in Streams of Programming," U.S. Appl. No. 61/561,186, filed Nov. 17, 2011, 70 pages.

Green et al., "Systems, Methods and Articles to Provide Content in Networked Environment," U.S. Appl. No. 61/587,475, filed Jan. 17, 2012, 98 pages.

Green et al., "Systems, Methods and Articles to Provide Content in Networked Environment," U.S. Appl. No. 61/677,968, filed Jul. 31, 2012, 84 pages.

Green et al., "Systems, Methods and Articles to Provide Content in Networked Environment," Office Action mailed Apr. 11, 2014, for U.S. Appl. No. 13/956,020, 13 pages.

King et al., "Content Injection System and Methodology," Office Action mailed Jul. 7, 2010, for U.S. Appl. No. 11/985,143, 12 pages.

King et al., "Content Injection System and Methodology," Amendment filed Jan. 7, 2011, for U.S. Appl. No. 11/985,143, 11 pages.

King et al., "Content Injection System and Methodology," Supplementary Response filed Jan. 20, 2011, for U.S. Appl. No. 11/985,143, 13 pages.

King et al., "Content Injection System and Methodology," Office Action mailed Mar. 29, 2011, for U.S. Appl. No. 11/985,143, 15 pages.

King et al., "Content Injection System and Methodology," Amendment filed May 27, 2011, for U.S. Appl. No. 11/985,143, 21 pages.

King et al., "Content Injection System and Methodology," Office Action mailed Feb. 21, 2012, for U.S. Appl. No. 11/985,143, 14 pages.

King et al., "Content Injection System and Methodology," Amendment filed Jul. 6, 2012, for U.S. Appl. No. 11/985,143, 25 pages.

King et al., "Content Injection System and Methodology," Notice of Allowance mailed Oct. 15, 2012, for U.S. Appl. No. 11/985,143, 16 pages.

King et al., "Content Injection System and Methodology," U.S. Appl. No. 60/860,573, filed Nov. 21, 2006, 7 pages.

* cited by examiner

SYSTEMS AND METHODS TO DELIVER A PERSONALIZED MEDIACAST

BACKGROUND

This disclosure generally relates to the automated provision of content to content consumers in a networked environment in a modified form from content broadcast or Webcast by content providers, and more particularly to insertion of alternative content segments into a sequence of content segments.

DESCRIPTION OF THE RELATED ART

Content providers such as radio stations and networks, television stations and networks (collectively, "broadcasters"), and Webcasters provide programming including programming content segments (e.g. music, talk, news, sports, weather, etc.) and non-programming content segments (e.g. advertisements, legal notices, etc.). Content providers' delivery of content via traditional "over the air" or terrestrial broadcast is often supplemented with Webcasts. In some instances, the Webcasts may be transmitted substantially contemporaneous with the broadcast. While content providers may employ repeaters and the like, broadcasts are typically limited in range to a geographic region.

Programming, for example broadcast or Webcast programming, often includes non-programming content or advertisements interspersed with the subject matter of the programming content which is the principal or main subject of the programming offered by the content provider. Programming content segments are often interspersed with non-programming content segments that are sometimes referred to as "ad breaks" since the non-programming content segments are often composed principally of paid advertising. Content providers typically sell advertising time to generate revenue to fund operation, as well as generate profits, where the content provider is a commercial entity rather than a nonprofit entity. Given that most broadcasts are local in nature or extent, broadcasters often carry advertisements and other material which is of a somewhat local or parochial interest. For example, a local chain may place advertisements with a local broadcaster since the audience targeted by the local chain is also often local and local advertising tends to be less expensive than regional or national advertising.

Often, content providers provide an alternative source of the programming, for example, providing a Webcast or even a podcast of the programming. The audience for the alternative source of programming may be significantly different from the audience for the broadcast. For example, the audience for the alternative source of programming may be more geographically diverse, or may be more comfortable with technologies such as streaming of content to desktop computers or even Smartphone devices. As such, the non-programming content interspersed in a broadcast or Webcast may not be particularly well suited, applicable or of interest to the audience of the alternative source of programming.

Content providers are increasingly using content delivery networks (CDNs) to cache content throughout a network. CDNs are typically a system of computers, often configured as servers, and may be geographically dispersed with respect to one another. CDNs are typically operated by third party entities. CDNs may improve access, for example allowing lowest cost routing and reducing latency. CDNs may also provide a measure of redundancy.

New approaches that automate the various activities related to providing requested content, customized or otherwise modified with or by the insertion of new or replacement materials, for instance, replacement programming content and replacement non-programming content to provide a personalized mediacast to each mediacast content consumer receiving the broadcast or Webcast are therefore quite desirable.

BRIEF SUMMARY

A content provider, for instance a broadcaster or Webcaster, may accommodate delivery of personalized broadcasts or Webcasts (collectively "personalized mediacasts") to audience members (collectively "mediacast content consumers"). In a personalized mediacast, each mediacast content consumer is provided the ability to replace selected portions of the programming content (e.g., content that is the principal or main content or subject of the broadcast or Webcast) provided by the broadcaster or Webcaster with new or replacement programming content. The programming content may take a variety of forms. For example, a radio station's primary content may be local news, weather, sports, songs, talk segments, comedy sketches or dramas. A television station's primary content may include televisions shows, including dramas, comedies, movies, or news segments. A Webcaster's primary content may include reviews of various devices, news reports, etc. Some or all of the programming content may be live. For example, a disc jockey may introduce a song or artist or may talk about past shows or concerts. News, weather, traffic, or sports are also often reported live. In some instances, the programming content may be recorded live, that is without interruptions, second takes or editing. For example, standup comedy may be recorded live. In still other instances, some or all of the programming content may be recorded. For example, interviews or documentaries may be pre-recorded, including use of retakes and/or editing. The programming content should not be confused with non-programming content, that is material that is not the primary or main content or subject of the broadcasts or Webcasts. Non-programming content may take a variety of forms, the most ubiquitous being paid advertisements or commercials.

Various systems and methods are described herein which provide personalized mediacasts which includes at least some programming content that is selected based on an end user or content consumer's expressed or discernible preferences, in addition to some content from a broadcast or Webcast. The content consumer specific programming content in the personalized mediacast may substitute for, replace or otherwise incorporate some of the programming content from the broadcast or Webcast. Various systems and methods are capable of interspersing live programming with content consumer specific on-demand programming, As described herein, the various systems and methods may advantageously employ buffering in interspersing live programming with content consumer specific on-demand programming.

Thus, the end user or content consumer can exercise a degree of control over programming content delivered to their media device. This contrasts with more conventional approaches which essentially replicates the broadcast or Webcast in a unicast fashion. This also contrasts with more recent approaches which may replace local advertisements in a broadcast with more generic advertisements in a streaming of the broadcast.

The various systems and methods may optionally buffer programming, or portions thereof. Such may advantageously allow substitution or replacement of broadcast or Webcast programming with new or replacement programming with little or no concern about matching lengths or durations of new or replacement programming segments with the lengths or durations of programming segments being replaced. For example, if new or replacement content is still being stream when a non-replaceable content segment of a broadcast begins, the non-replaceable content is buffered until the new or replacement content segment is finished. The non-replaceable content is then delivered or play from the buffer. Likewise, if non-replaceable content is still being delivered or streamed from the buffer when a marker or meta data indicates that a replaceable content segment is beginning in the broadcast or Webcast, the delivery or playing of the non-replaceable content from the buffer is finish. Such may inherently reduce synchronicity between the broadcast or Webcast and the personalized mediacast.

The various systems and methods may optionally provide personalized mediacasts which include at least some non-programming content (e.g., advertisements, commercials) that is selected based on an end user or content consumer's expressed or discernible preferences. Such may be in place of, or in addition to, some non-programming content from the broadcast or Webcast. Such content consumer specific non-programming content may be selected based on a variety of criteria for instance geo-targeting, device targeting, or demographic targeting.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION

Figure 1:
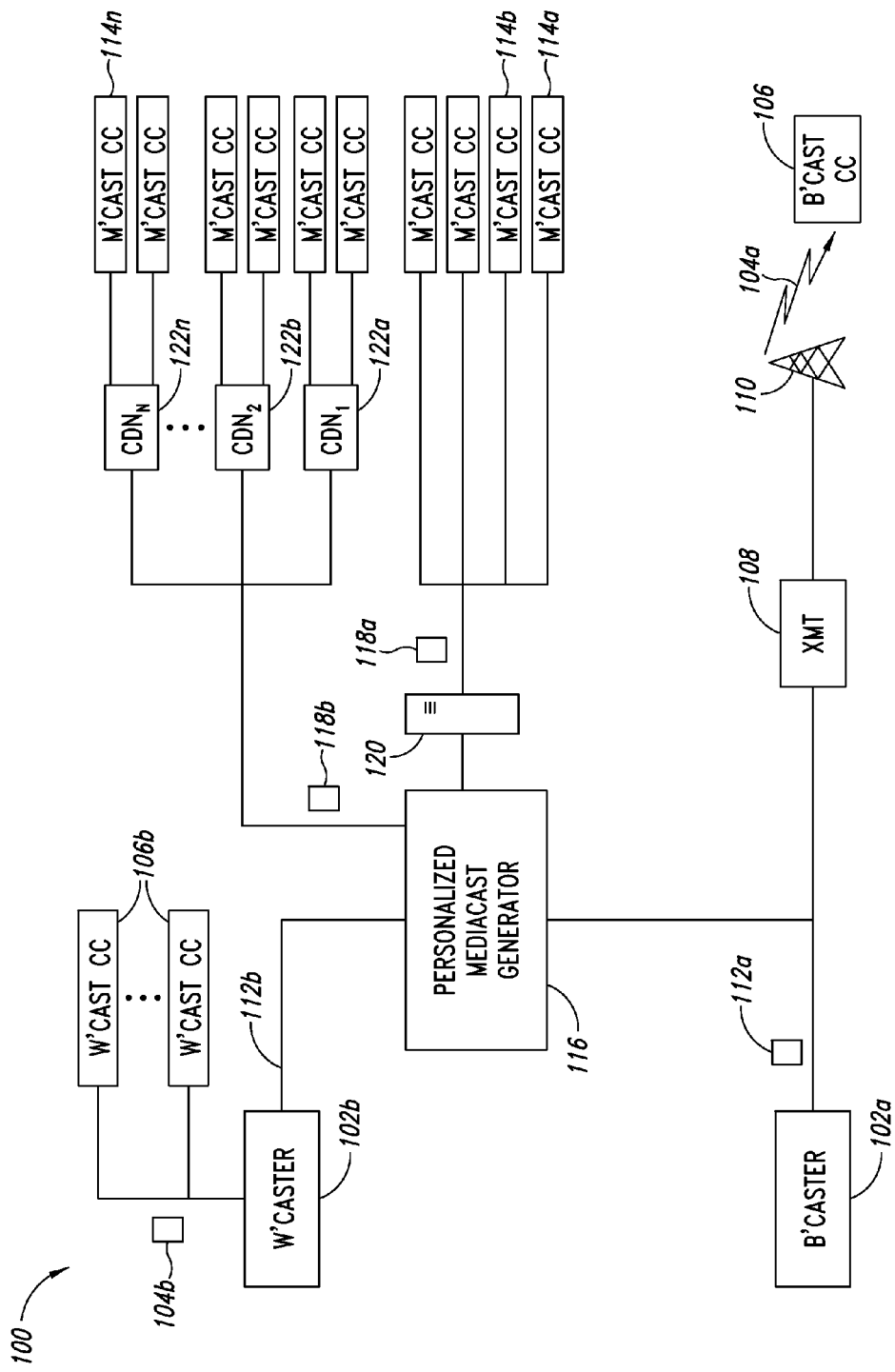
FIG. 1 is a schematic diagram of a networked environment, including a broadcaster or Webcaster, a number of broadcast or Webcast content consumers, a personalized mediacast generation system operable to generate a plurality of personalized mediacasts, and an optional content delivery network (CDN) to deliver the personalized mediacasts to respective mediacast content consumers; according to one illustrated embodiment, in which replacement programming content segments are selected based upon one or more mediacast content consumer selection criterion.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with computing systems including client and server computing systems, broadcast systems including radio and television broadcast systems, as well as networks and other communications channels have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is, as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

As used herein the terms broadcast or Webcast programming refer to a sequence of content intend to be broadcast or Webcast by a broadcaster or Webcaster. The broadcast or Webcast programming may include programming content and non-programming content. As used herein, programming content refers to content which is the primary or main subject of the broadcast or Webcast, examples include songs for a music format radio station or talk segments for a talk radio format radio station. As used herein, non-programming content refers to content which is not the primary or main subject of the broadcast or Webcast, examples include advertisements or commercials. The programming content and/or the non-programming content may be either non-replaceable or replaceable, as identified by an entity, for example a broadcaster or Webcaster, and indicated in meta data or a marker at least logically associated with the content. Non-replaceable content is content that is not to be replaced, examples include news segments or sports segments. Replaceable content is content that may be replaced, examples include a block of songs for a music format radio station or a talk segment for a talk format radio station. As used herein, the term new or replacement programming and non-programming content segments refers to content used to generate a personalized mediacast, in addition to the broadcast or Webcast programming. Such may include programming content and non-programming content. Such may be substituted for replaceable programming or replaceable non-programming content in generating a personalized mediacast or otherwise incorporated therein. Alternatively, new or replacement programming and non-programming content segments such may be used in addition to replaceable programming or replaceable non-programming content in generating personalized mediacasts. As used herein manifest content refers to a set of entries that specify locations or specific properties of content or media fragments, specifying a linear or sequential order. A used herein manifest consumer device refers to a mediacast content consumer device (e.g., media player executing on a processor-based device) that requests and utilizes manifest content. As used herein dynamic manifest refers to a manifest file that is generated upon a request of a mediacast content consumer device. As used herein content or media fragment refers to a digital media 'file' into which content has been broken, typically having a duration of 2-10 seconds. Presently, content or media fragments are primarily based on fragmented mp4 (FMP4) or MPEG TS (M2TS).

The headings and Abstract of the Disclosure provided herein are for convenience only and do not interpret the scope or meaning of the embodiments.

System Overview—Delivery of Programming to Content Consumers

FIG. 1 shows an environment 100 including a radio broadcaster or television broadcaster 102a delivering a broadcast 104a to a plurality of broadcast content consumers (illustrated collectively) 106a via a broadcast transmitter 108 and antenna 110. The environment 100 may additionally, or alternatively, include a Webcaster 102b that provides Webcasts 104b to a plurality of Webcast consumers 106b via servers and various networks (e.g., Internet).

The broadcast 104a or Webcast 104b (collectively 104) consists of broadcaster or Webcaster programming, which includes a variety of programming content and a variety of non-programming content, which may be divided up into segments. Programming content segments are typically portions of the programming that are the principal or main subjects of the broadcast or Webcast, and may be used to identify or characterize the broadcaster or Webcaster. Examples of programming content include songs or music, news, weather, traffic, talk shows, comedy sketches, audio content, video content, personalities, or the like. Non-programming content segments are the remaining portions of the programming which are not the principal or main subjects of the broadcast or Webcast. Examples of non-programming content include paid advertisements or commercials, legally required announcements (e.g., station identification announcements), and public service announcements. All broadcast or Webcast content consumers 106 receive identical programming 112 comprising a seamless flow of programming and non-programming content segments, the specific content and order or which is chosen by the broadcaster 102a or Webcaster 102b (collectively 102).

Many broadcasters or Webcasters 102 also would like to provide all or a portion of their programming to mediacast content consumers 114a, 114b-114n (ten illustrated, three called out, collectively 114) via alternative channels such as Webcasts, podcasts, streaming and similar delivery methods. Such alternative channels typically provide for on demand delivery, for example as a unicast streaming, or in some instances as a multicast streaming to the media content consumers 114. The alternative channels typically permit geographically diverse mediacast content consumers 114 to access the programming content using communications technologies other than local over the air (i.e., terrestrial) broadcast transmission or transmission via local cable networks.

To accommodate the diverse tastes and interests of the respective mediacast content consumers 114, the programming 112 may be further apportioned into replaceable programming content segments and non-replaceable programming content segments. Replaceable programming content segments include any portion of the programming identified by the broadcaster or Webcaster or other entity as being eligible for replacement by mediacast content consumer specific programming content. For example, musical programming supplied by a broadcaster or Webcaster may be identified as replaceable programming content segment. Non-replaceable programming content may include any portion of the programming identified by the broadcaster or Webcaster or other entity as not eligible for replacement by mediacast content consumer specific programming. Typical examples of non-replaceable programming content include talk radio segments, news, sports, weather, and financial segments within the programming supplied by the broadcaster or Webcaster. In some instances, non-replaceable programming content may include songs or music. For example, one or two songs at a start and/or an end of a programming content segment may be identified as non-replaceable. This will allow a disc jockey providing live narration to discuss the songs or artist or events related to the song or artist (e.g., upcoming show) at the beginning and/or end of a programming content segment. Such will make a personalized broadcast sound very similar to a live radio broadcast.

Optionally, the non-programming content segments (e.g., commercials, advertisements) of the broadcast or Webcast provided by the broadcaster or Webcaster may be apportioned into replaceable non-programming content segments and non-replaceable non-programming content segments. Replaceable non-programming content segments can include advertisements or open air "spots" carried by the programming supplied by the broadcaster or Webcaster that may have limited or no value to the mediacast content consumers 114. Examples include advertisements for products and services available in the broadcaster or Webcaster's home market, but unavailable in markets where many or even all of the mediacast content consumers 114 may be located. Non-replaceable non-programming content segments can include legally required station identification announcements, public service announcements, emergency broadcasting network tests, and the like. Non-replaceable non-programming content segments can additionally or alternatively include advertisements or commercials with generic appeal or related to a wider market, for instance a national market. Non-replaceable non-programming content segments can additionally or alternatively include advertisements or commercials for which Web distribution has been guaranteed, for instance guaranteed by the broadcaster or Webcaster.

As depicted in FIG. 1, a personalized mediacast generation system 116 may be coupled to receive programming 112a, 112b (collectively 112) that constitutes the broadcast or Webcast. The personalized mediacast generation system 116 may be configured to generate, produce or otherwise provide personalized mediacasts 118a, 118b (two shown, collectively 118) for respective ones of the mediacast content consumers 114.

While illustrated as a single personalized mediacast generation system 116 communicatively coupled to both a broadcaster 102a and Webcaster 102b, many implementations will employ two or more separate personalized mediacast generation systems 116, for example a respective personalized mediacast generation system 116 for each of the broadcaster(s) and/or Webcaster(s). All or a portion of the personalized mediacast generation system 116 may be separately or co-located. All or a portion of the personalized mediacast generation system 116 may be co-located at the broadcaster or Webcaster facilities. All or a portion of the personalized mediacast generation system 116 may be located separately from the broadcaster or Webcaster facilities. All or a portion of the personalized mediacast generation system 116 may be implemented "in the cloud" as a virtualized system or component. All or a portion of the personalized mediacast generation system 116 may be co-located at the mediacast content consumer 114.

The personalized mediacasts 118 include at least some of the programming content 112 of the broadcast or Webcast, as well as some mediacast content consumer specific programming content that is selected based on an end user or mediacast content consumer's expressed or discernible preferences (i.e., content consumer replacement programming content selection criterion).

In some implementations, the personalized mediacasts 118 include non-programming content, for instance advertisements or commercials. The non-programming content may include non-programming content from the broadcast or Webcast 104. The non-programming content may include new or replacement non-programming content, which did not appear in the broadcast or Webcast 104. Such new or replacement non-programming content may substitute for or replace in the personalized mediacast 118, in whole or in part, non-programming content from the broadcast or Webcast 104. Such new or replacement non-programming content may be selected to target a specific mediacast content consumer 114 for which the personalized mediacast 118 is intend or personalized. Alternatively, the new or replacement non-programming content may be selected to target a more generic audience or have wider interest than the non-programming content in the broadcast or Webcast 104. Alternatively, the new or replacement non-programming content may even be selected to target a specific demographic.

Each of the various types of content segments may include one or more beginning of segment markers, end of segment markers, rejoin markers, break markers or the like, that indicate the beginning or end of the respective content segment. Such markers typically take the form of meta data logically associated with the content segments. The marker or meta data is useful in providing a machine detectible indication that a particular type of content segment in the broadcast or Webcast programming is commencing or ending. Thus, the marker or meta data facilitates the automated generation of a personalized mediacast with new or replacement programming content segments and/or new or replacement non-programming content segments combined with the non-replaceable programming content segments supplied by the broadcaster or Webcaster. As explained in more detail herein, the marker or meta data may also be part of a trigger condition for the buffering of content, for instance non-replaceable content segments, and/or the subsequent unbuffering, delivery or playing of the buffered content.

As illustrated in FIG. 1, the personalized mediacast generation system 116 may transmit or deliver the personalized mediacasts 118 to respective mediacasts content consumers 114 via one or more networks (e.g., Internet, local area networks, wide area networks, wired networks, wireless networks). The personalized mediacast generation system 116 may include, or may employ, one or more server computer systems to transmit or deliver the personalized mediacasts 118.

Additionally or alternatively, the personalized mediacast generation system 116 may optionally employ one or more content delivery networks (CDNs) 122a-122n (three illustrated, collectively 122) to cache, store, or distribute all or a portion of the personalized mediacasts 118. Although the broadcaster or Webcaster 102 may have access to sufficient infrastructure to support the delivery of hundreds or thousands of personalized mediacasts 118 directly to each of the mediacast content consumers 114, in many instances the broadcaster or Webcaster 102 may alternatively route the personalized mediacasts 118 for at least a portion of the mediacast content consumers 114 through a CDN 122. A CDN 122 supplies the necessary infrastructure in the form of various network servers, switches, routers and the like useful in delivering the personalized mediacasts 118 to each of the content consumers 114. CDNs 122 can be regionally located in closer proximity to the mediacast content consumers 114 and can be linked to the broadcaster or Webcaster via one or more high speed or high bandwidth connections to minimize the latency and improve the overall mediacast experience of each of the mediacast content consumers 114. In some instances, the CDNs 122 provide network redundancy to improve the reliability of the connection between the mediacast content consumers 114 and the broadcaster or Webcaster 122.

Personalized Mediacast Generation System

Figure 2:
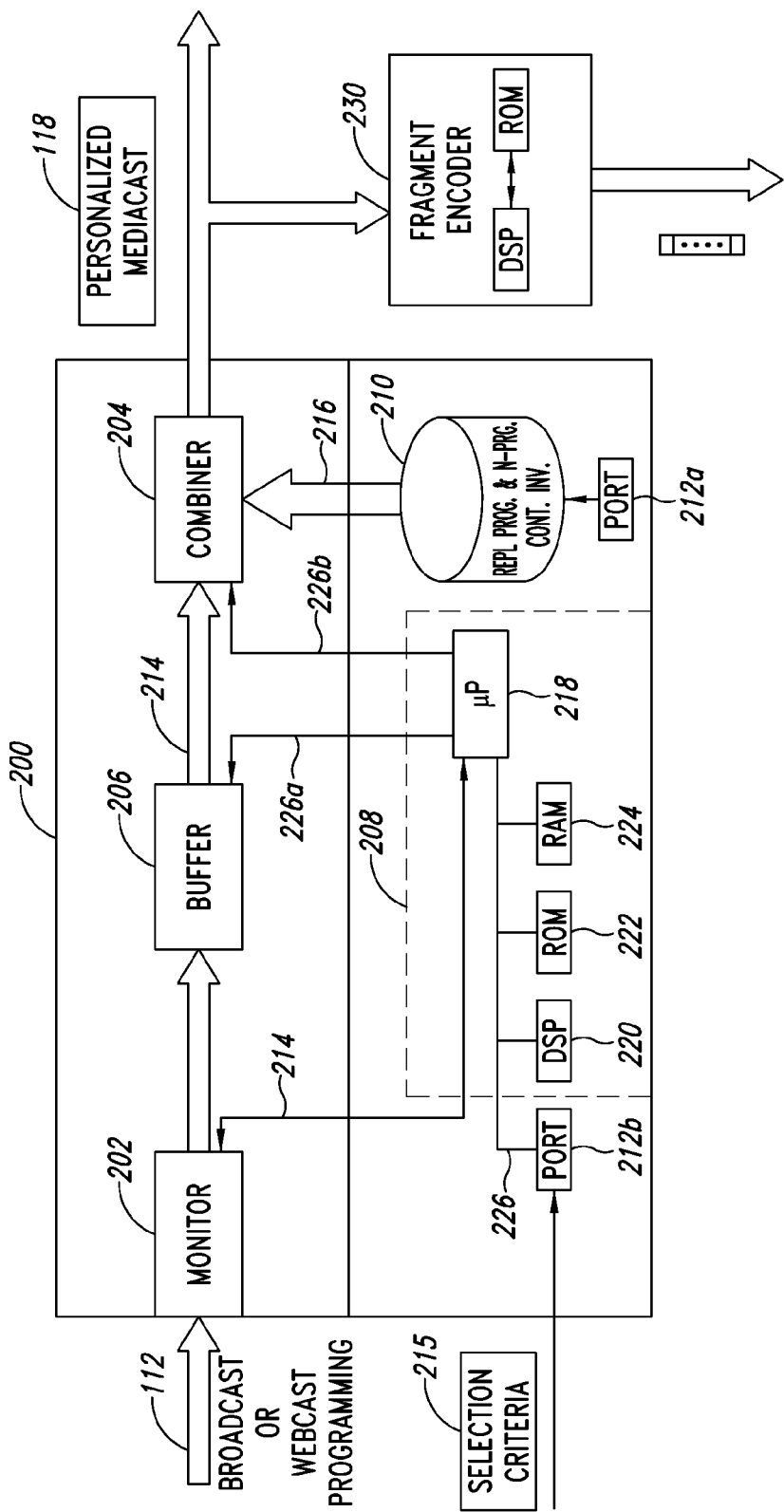
FIG. 2 is a schematic diagram of a personalized mediacast generation system including an inserter coupled to detect replaceable programming and non-programming content segments in broadcasts or Webcasts, optionally insert replacement programming and non-programming content segments for the replaceable content to generate a personalized mediacast and an optional fragment encoder coupled to encode the personalized mediacast as content or media fragments, according to one illustrated embodiment.

FIG. 2 shows an example of a personalized mediacast generation system 200, according to one illustrated embodiment.

The personalized mediacast generation system 200 includes a monitor 202 to detect the occurrence of markers or meta data in the programming and a combiner 204 operable to selective combine portions of the broadcast or Webcast programming 112 (FIG. 1) with new or replacement content. The personalized mediacast generation system 200 may also include a buffer 206, a control subsystem 208, and a nontransitory computer- or processor-readable medium 210, each directly or indirectly communicatively coupled with the monitor 202 and combiner 204. As explained in more detail below, the buffer 206 is communicatively coupled, configured and/or controlled to temporarily buffer or store broadcast or Webcast programming content and selectively release, deliver or unbuffer the programming content on occurrence of certain conditions. The control subsystem is communicatively coupled and configured to control the operation of the personalized mediacast generation system 200, including the various components thereof. The nontransitory computer- or processor-readable medium 210 stores new or replacement programming content segments and/or new or replacement non-programming content segments for use in combining with portions of the broadcast or Webcast programming 112 (FIG. 1) to create the personalized mediacasts 118 (FIG. 1).

The personalized mediacast generation system 200 is communicatively coupled to receive original broadcast or Webcast programming 112 from a broadcaster or Webcaster 102. For example, the personalized mediacast generation system 200 may be communicatively coupled to receive an audio feed (e.g., digital or analog) from a sound board of a radio broadcaster or a video feed from a video board of a television broadcaster.

An optional communications port 212a, permits the receipt of new or replacement programming content segments and/or new or replacement non-programming content segments from an external source, for example from an external advertiser, external advertising marketplace, external replacement programming content provider and the like. An optional communications port 212b allows receipt of commands, instructions, data, and programming. For example, various types of selection criterion 215 may be received via communications port 212b. While two ports 212a, 212b (collectively 212) are illustrated, the personalized mediacast generation system 200 may include fewer or greater number of ports 212.

As noted above, a primary function of the personalized mediacast generation system 200 is to detect meta data or markers, for example rejoin markers. As described above, the meta data or markers signify the beginning and/or ending of the different content segments. The beginning and ending of at least certain content segments are conditions that may wholly or partially control an operational state of the combiner 204, and optionally of the buffer 206. The occurrence of such may, for example, satisfy one condition for triggering the replacement of replaceable programming content segments with replacement programming to generate or create the personalized mediacasts 118. The occurrence of such may, for example, satisfy one condition for triggering the replacement of replaceable non-programming content segments with new or replacement non-programming content segments to generate or create the personalized mediacasts 118. In either situation, a second condition may need to be satisfied, that is that a current content segment be completed before switching between the broadcast or Webcast and some repository of new or replacement content. Such, for example, triggers the creation of a plurality of personalized mediacasts 118, each containing new or replacement programming content segments selected, for example, based upon a mediacast content consumer selection criterion which may be supplied by the mediacast content consumer or discernible about the mediacast content consumer. Likewise, the personalized mediacasts 118 may include new or replacement non-programming content segments, for example, selected based upon one or more mediacast content consumer demographics, locations, etc., to create a personalized mediacast 118 uniquely tailored to an individual mediacast content consumer 114.

In some implementations, the monitor 202 detects meta data or markers or similar indicators designating a transition in programming content. The monitor 202 may, for example, detect the start or end of replaceable programming or replaceable non-programming content segments in the originating broadcast or Webcast programming 112. The monitor 202 may, for example, detect the start or end of replaceable programming content segments, for instance, entertainment content (e.g., songs or block of songs) in the originating broadcast or Webcast programming 112. Many types of broadcast or Webcast programming 112 include such meta data or markers or other indicators to designate the start and/or end of certain segments, for instance, marking the start or end of replaceable non-programming content segments or the start or end of replaceable or non-replaceable programming content segments. In some instances, the meta data or markers or other indicators simply mark the occurrence of the start or end of a segment. In other instances, the meta data or markers or other indicators include information or data about the respective content segment. For example, start meta data, or marker or other indicator may include information that specifies a duration of the subsequent content segment. The meta data or markers or other indicators may additionally or alternatively include other information. The monitor 202 scans the broadcast or Webcast programming 112 for meta data or markers or other indicators and produces an output or signals on a signal line 214 in response to detection of the same. The monitor 202 may also extract any information or data included in, or with, the indicator marker, for instance, an indication of the duration of the subsequent segment, providing such to the control subsystem 208, for example via signal line 214.

The buffer 206 is downstream from the monitor 202 and may buffer original broadcast or Webcast programming 112 when necessary or desirable. For example, such may allow time-shifting of content segments contained in the originating broadcast or Webcast programming 112, which may increase flexibility of the personalized mediacast generation system 200. For example, where a duration of new or replacement programming or non-programming content segments either individually or cumulatively match a duration of the replaceable programming or non-programming content segments that they are to replace, the duration of the original broadcast or Webcast programming 112 stored by the buffer 206 may remain constant or not change. Where the duration of new or replacement programming or non-programming content segments either individually or cumulatively exceed a duration of the replaceable programming or non-programming content segments that they are to replace, the original broadcast or Webcast programming 112 stored by the buffer 206 may grow or increase. Where a duration of new or replacement programming or non-programming content segments is less than a duration of the corresponding replaceable programming or non-programming content segments either individually or cumulatively that they are to replace, the broadcast or Webcast programming stored by the buffer 206 may shrink or be reduced. Notably, while the contents of the buffered may be played out during non-replaceable content segments of the broadcast, the contents of the buffer is reduced by playing buffered content from the buffer during replaceable content segments since there is no simultaneous storing to the buffer during these periods. The buffer may function as a queue, receiving new content segments at one end of the queue, while playing previously received content segments from the other end of the queue. The buffer 206 may advantageously allow selection of new or replacement programming and non-programming content segments having durations without particular regard to trying to match a duration of the replaceable programming and non-programming content segments that they are to replace.

The duration of any asynchronicity between the originating broadcast or Webcast programming 112 and the personalized mediacast 118 may be permitted to "float"—in other words, the selection of replacement programming and non-programming segments may be performed without specific regard to the duration of the new or replacement programming or non-programming segments or the duration of the replaceable programming or non-programming segments being replaced. In at least some implementations, new or replacement programming and non-programming content segments are not selected until meta data or a marker is detected in the originating broadcast or Webcast programming 112 by the monitor 202. Upon detection by the monitor 202 of certain meta data or markers indicative of a start of a non-replaceable content segment in the broadcast or Webcast programming 112, buffering of the non-replaceable originating broadcast or Webcast programming 112 to the buffer 206 can be started. Upon detection by the monitor 202 of certain meta data or markers indicative of an end of a non-replaceable content segment (e.g., programming content, non-programming content) in the broadcast or Webcast programming 112, delivery of a current new or replacement content segment to the combiner 204 may be allowed to finish, then the buffered content may be delivered from the buffer 206 to the combiner 204.

The combiner 204, also sometimes referred to as an alternative content inserter, is coupled downstream of the buffer 206. The combiner 204 selectively combines portions of the broadcast or Webcast programming 112 (e.g., non-replaceable content segment) with new or replacement programming and non-programming content segments to generate, create or otherwise produce the personalized mediacasts 118. For example, the combiner 204 may combine material from the new or replacement programming and non-programming content segment inventory 210 with non-replaceable programming and non-programming content segments of the originating broadcast or Webcast programming 112. For instance, replaceable programming content segments (e.g., songs or blocks of songs) appearing in the originating broadcast or Webcast programming 112 may be replaced with replacement programming content segments (e.g., songs or music selected based at least in part on mediacast content consumer specifications). In some instances, the new or replacement programming and non-programming content segments may be targeted or personalized for a particular mediacast consumer. In some instances, the new or replacement non-programming content may be more appropriate for wider audience than the replaceable non-programming content in the broadcast or Webcast which is being replaced. In some instances, the new or replacement non-programming content may be targeted to a specific mediacast content consumer or audience than the replaceable non-programming content in the broadcast or Webcast which is being replaced. Thus, the personalized mediacast 118 transmit, for instance via the Worldwide Web, may be more personalized for the specific mediacast content consumer as compared to the broadcast or Webcast programming 112 which is transmitted via conventional radio or television broadcasts.

The combiner 204 can take a variety of forms, as simple as a switch that selectively couples a downstream component or output of the personalized mediacast generation system 200 alternatively between a first input 214 (e.g., from buffer 206) that carries the originating broadcast or Webcast programming 112 and a second input 216 such as the insertion material inventory 210 that carries the replacement programming and non-programming content segments.

The control subsystem 208 may take a variety of forms. Typically, the control subsystem 208 will include one or more controllers, for example, microprocessors 218, DSPs 220, ASICs, PGAs, microcontrollers or the like. The control subsystem 208 will also typically include one or more nontransitory nonvolatile memories such as ROM or FLASH memory 222 and/or one or more volatile memories such as RAM 224. One or more communications ports 212, for example, parallel communications ports (e.g., Ethernet port) or serial communications ports (e.g., Universal Serial Bus ports) may be considered part of the control subsystem 208 or may be considered separate therefrom. The one or more communications ports 212 may allow wired and/or wireless communications with an alternative source of replacement programming and non-programming content segments. The one or more communications ports 212 may allow wired and/or wireless communications to receive instructions, commands, data or programming (e.g., firmware upgrades).

The various components of the control subsystem 208 may be coupled via one or more buses 226 (only one shown), for example, one or more power buses, communications buses, instruction buses, address buses, data buses, etc.

The control subsystem 208 is configured or programmed to control the operation of the personalized mediacast generation system 200. The control subsystem 208 is communicatively coupled to receive via signal line 214 one or more signals or data packets upon detection of a meta data or a marker or other indicator by the monitor 202. The one or more signals or data packets may be indicative of the start, end, duration, or any combination thereof of a replaceable programming content segment, replaceable non-programming content segment, or non-replaceable programming content segment in the broadcast or Webcast programming 112. The one or more signals or data packets may also be indicative of other information, for instance, the type of content segment, content of the content segment, format of the content segment or language of the content segment.

The control subsystem 208 may, for example, determine to insert a new or replacement programming content segment upon detecting meta data or a marker indicative of a start of a replaceable programming content segment in the broadcast or Webcast programming 112. The new or replacement programming content segment may, for example, be selected based on some mediacast content consumer specific information (i.e., content consumer replacement programming content selection criterion), supplied by a specific mediacast content consumer 114 (FIG. 1) or otherwise discernible about the specific mediacast content consumer 114.

The control subsystem 208 provides control signals to the buffer 24 via a buffer control line 226a to control the buffering or caching of originating broadcast or Webcast programming 112 by the buffer 206. The control subsystem 606 provides control signals to the combiner 204 via combiner control line 226b to control the combining of new or replacement programming and/or non-programming content segments with non-replaceable programming and/or non-programming content segments of the broadcast or Webcast programming 112. The control signals may cause the buffer 206 to selectively store or buffer originating broadcast or Webcast programming 112 while the combiner 204 is combining or inserting or placing replacement programming or non-programming content segments to generate or create the personalized mediacast 118.

The personalized mediacast generation system 200 may select replacement programming content segments based on content consumer supplied selection criterion values associated with: a song, a musical artist, a performing artist, a dramatic artist, a musical group, an album, a musical work, a theatric work, a film work, or a television work. The personalized mediacast generation system 200 may select replacement non-programming content segments based on selection criterion values associated with: demographic information regarding the audience, demographic information regarding the target audience for the advertisement, and/or maximize advertising revenue generated by the advertisement insertions.

In one or more implementations, one or more optional fragment encoders 230 may be positioned downstream of the personalized mediacast generation system 200. Such may be particularly useful where the personalized mediacasts will be delivered via "chunk based" delivery, for example via one or more CDNs 122 (FIG. 1).

The personalized mediacast generation system 200 may be similar, or even identical, in structure and/or operation to the content injection system described in U.S. patent application publication No. 2008/0120638 published May 22, 2008 or U.S. patent application Ser. No. 61/561,186 filed Nov. 17, 2011. That content injection system advantageously employs selective buffering or caching so that replacement programming or non-programming content segments do not need to be exactly the same length or duration as the replaceable programming or non-programming content segments they supplant. Additionally, or alternatively, the personalized mediacast generation system 200 may in some respects be similar or identical in structure and/or operation to that described in U.S. patent application publication No. 2007/0074243. Additionally, or alternatively, the personalized mediacast generation system 200 may in some respects be similar or identical in structure and/or operation to that described in U.S. Pat. No. 6,577,716.

New or Replacement of Programming Content Segments

Generally, replacement programming content segments are selected based at least in part upon one or more content consumer replacement programming content selection criterion 215 (FIG. 2). The content consumer replacement programming content selection criterion 215 may be communicated by each of the respective mediacast content consumers 114 (FIG. 1), for example to the broadcaster or Webcaster 102 or to some other entity. Alternatively, or additionally, the content consumer replacement programming content selection criterion 215 may be discernible from other information (e.g., various selections by a specific mediacast content consumer 114 or other information about the mediacast content consumer 114).

The content consumer replacement programming content selection criterion 215 can include a value indicative of a type of programming content desired by the mediacast content consumer. For example, the content consumer replacement programming content selection criterion 215 can include a value indicative of one or more of at least one of: a song, a musical artist, a performing artist, a dramatic artist, a musical group, an album, a musical work, a theatric work, a film work, a television work, a comedian, a comedy, a talk show host, a talk show segment, etc.

In some embodiments, the mediacast content consumer 114 can access only a limited repository of replacement programming content segments based upon a playlist or artist list supplied or defined by the specific broadcaster or Webcaster 102. Such may be based upon pre-approved or pre-determined replacement programming content selected by the broadcaster or Webcaster 102, for example in keeping with a genre (e.g., jazz, alternative rock, oldies, talk) appropriate for the broadcaster or Webcaster 102.

For example, a classic rock radio broadcaster 102 may broadcast a replaceable content segment containing music curated by the broadcaster 102—for example a Rolling Stones song, a Beatles song, a Led Zeppelin song and a Jefferson Airplane song. The monitor 202 (FIG. 2) detects meta data or a marker indicating a beginning of a replaceable content segment. A specific mediacast content consumer 114 may have previously indicated a preference for music by The Moody Blues® or music that sounds like The Moody Blues®. For example, the specific mediacast content consumer may have communicated, directly or indirectly, a replacement programming content selection criterion 215 containing a value indicating a desire to hear music by or similar to The Moody Blues®, for instance to the broadcaster 102 or some proxy system. In response, upon detecting the replaceable programming content segment meta data or marker, the combiner 204 (FIG. 2) accesses replacement programming content repository 210 (FIG. 2) that includes music by The Moody Blues®, or music that sounds like The Moody Blues® according to a judgment or assessment by an automated algorithm used by the broadcaster 102 or partners of the broadcaster 102 used to select the replacement programming content. The combiner 204 then begins transmitting the replacement programming content segment to specific mediacast content consumer 114, essentially combining the replacement programming content segment with previous content segments (e.g., non-replaceable content segments) to create the personalized mediacast 118.

The replacement programming content segment is seamlessly interleaved with the remaining portion of the programming forming the personalized mediacast 118 delivered to the specific mediacast content consumer 114. Such may continue until the specific mediacast content consumer 114 either transmits another replacement programming content selection criterion 215 or terminates the personalized mediacast 118. Thus, each subsequent replaceable programming content segment of the broadcast or Webcast programming 112 will be seamlessly replaced with replacement programming content segments featuring or sounding similar to The Moody Blues®. Note that in the absence of a replacement programming content selection criterion 215, the specific mediacast content consumer 114 will continue to receive the original broadcast or Webcast programming 112, including the replaceable programming content. In a similar manner, each of the respective content consumers 114 can receive appropriate or personalized replacement programming content segments based on their respective programming content selection criterion 215.

New or Replacement of Non-Programming Content Segments

Generally, replacement non-programming content segments are selected based at least in part upon one or more replacement non-programming content selection criterion selected or supplied by or more of: 1) the mediacast content consumer, 2) the broadcaster or Webcaster, and/or 3) a third party such as an advertiser or advertising agency. The third party may, for example, take the form of an advertiser, an advertiser network, or an advertisement broker.

The one or more replacement non-programming content segments can be selected based upon a value associated directly or indirectly with the mediacast content consumer 16, for example, a property or characteristic of the mediacast content consumer. In some instances, the replacement non-programming content segment may be selected at least in part based upon a market demographic represented by one or more market demographic values associated with the respective one of the plurality of mediacast content consumers 16 (e.g., age, gender, home zip code) or any other value that characterizes the mediacast content consumer 16 based upon, for example, a personal attribute) or a geographic value associated with the respective one of the plurality of mediacast content consumers 16, for example a geographic value that represents a current estimated geographic location of the mediacast content consumer.

Thus, the new or replacement non-programming content segments may be selected for or targeted to a specific mediacast content consumer 114 (FIG. 1). For instance, the replacement non-programming content segment may be selected at least in part based upon a respective mediacast content consumer self-reported attribute value associated with the replacement non-programming content segment by a third party. Also for instance, the replacement non-programming content segment may be selected at least in part based upon a prior behavior of the mediacast content consumer 114 (FIG. 1). For example, such may be based on a respective mediacast content consumer 114 (FIG. 1) prior purchase history value associated with the replacement non-programming content segment by a third party; For example, an advertisement for a new brand of sports watches may be of particular interest to prior purchasers of a sports watch or prior purchasers of other types of sports equipment. The replacement non-programming content segments may be selected based at least in part upon a prior purchase value associated with the respective one of the plurality of mediacast content consumers 114 (FIG. 1)).

Alternatively, the new or replacement non-programming content segments may be selected for or targeted to some demographic of mediacast content consumers. For example, a replacement non-programming content segment advertisement for motor oil may be targeted at a male demographic between the ages of 25 and 49 while a replacement non-programming content segment advertisement promoting membership in the American Association of Retired Persons (AARP®) may be targeted at a male and female demographic between the ages of 49 and 65. The replacement non-programming content segments may be selected based at least in part upon a market demographic value associated with the replacement non-programming content segment by a third party.

For instance; the new or replacement non-programming content segments may be selected for or targeted based at least in part on a result of a survey of non-programming content segments associated with other mediacast content consumers within a delineated geographic area of the respective one of the plurality of mediacast content consumers; a result of a survey of programming content segments associated with other mediacast content consumers with whom the respective one of the plurality of mediacast content consumers has indicated an association; a result of a survey of purchases associated with other mediacast content consumers with whom the respective one of the plurality of mediacast content consumers has indicated an association; and at least one self-reported value associated with respective mediacast content consumers. Such may take advantage of various social networking platforms (e.g., FACEBOOK®, CLASSMATES®, LINKED IN®) to draw logical connections or associations between a specific mediacast content consumer and other end users. This advantageously allows information collected, either explicitly or implicitly, about those end users to be used as a proxy for the specific mediacast content consumer 114 (FIG. 1). For instance, preferences, browsing history and/or shopping history of various end users who are logically connected or associated with a specific mediacast content consumer 114 (FIG. 1) may be used to determine which non-programming content to target to that specific mediacast content consumer 114.

Additionally or alternatively, the new or replacement non-programming content segments may be selected for or targeted based at least in part on a geographic value (e.g., targeted geographic area or region). For instance, an Internet Protocol address associated with a respective one of the plurality of mediacast content consumers may be employed to determine or at least estimate a home geographical location or a current geographical location of the respective mediacast content consumer 114 (FIG. 1). The particular geographic area may be logically associated with demographic information, for example wealth, spending habits, etc., of the general population of that geographic area.

In other instances, the replacement non-programming content segment may be selected based at least in part upon one or more financial aspects associated with the non-programming content segment. For example, the replacement non-programming content segment may be selected based at least in part on the income provided to the broadcaster or Webcaster for running the advertisement. The replacement non-programming content segments may be selected based at least in part upon an income value associated with the replacement non-programming content segment; a public service value associated with the replacement non-programming content segment; and a legal obligation value associated with the replacement non-programming content segment.

Relative Synchronization of Mediacasts with Respect to Broadcaster or Webcaster Programming Recall programming content segments are considered either replaceable or non-replaceable. Non-replaceable content segments may include one or more time sensitive features, for example news at the top of the hour and at 30 minutes after the hour, a disc jockey talking about a song or artist that was just played or that is about to be played, a real time traffic report, a real time phone call from a listener or to a personality, etc. Thus, the systems and method herein are capable of operating with live content and live broadcasting. All content consumers, whether broadcast, Webcast or mediacast content consumers, may rely upon the timeliness of the news segments, i.e., the segments should occur as close as possible if not at the top of the hour and at 30 minutes after the hour. Minimizing asynchronicity between the broadcast, Webcast and the plurality of mediacasts delivered to the plurality of mediacast content consumers 29 is therefore desirable.

Figure 3:
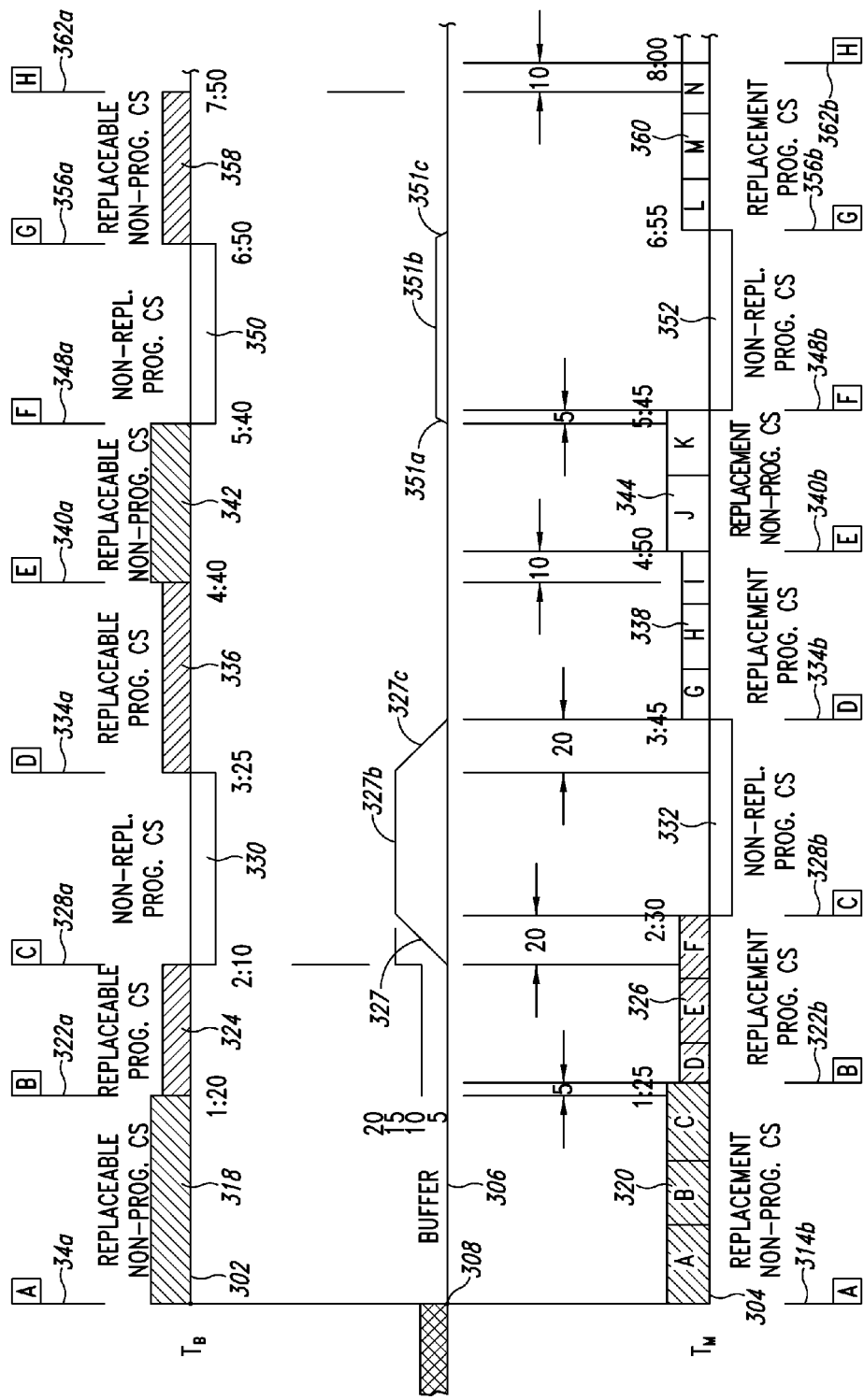
FIG. 3 is a timing diagram of a networked environment depicting the temporal relationship between programming provided as a broadcast or Webcast and an example personalized mediacast delivered to a mediacast content consumer; and specifically illustrating increasing and decreasing asynchronicity between the programming and the personalized mediacast, according to one illustrated embodiment.

FIG. 3 shows an example broadcast timeline ($T_B$) 302 and an example personalized mediacast timeline ($T_M$) 304. Asynchronicity between portions of the broadcast or Webcast programming 302 and the corresponding portions of the personalized mediacast 304 may be attributed to differences in duration or length between replacement content segments or material and the replaceable content segments or materials which they replace. Such may be due to individual differences in length or duration, and/or due to differences in cumulative length or duration. The personalized mediacast generation system 116 (FIGS. 1 and 2) accommodates these differences in length or duration via buffering of the broadcast or Webcast programming 112 or portions thereof. This buffering is depicted on the buffering timeline 306.

While buffering is generally illustrated and described in the description as occurring at the personalized mediacast generation system 116, such may occur elsewhere (e.g., CDN 122, mediacast content consumer 114). The buffering timeline 306 represents only one example of a sequence of content segments. In some implementations a difference sequence of content segments may occur. For example, a replaceable or non-replaceable non-programming content segment may occur immediately following a non-replaceable programming content segment. Also for example, some types of content segments may not occur and/or other types of content segments may occur, Based on the description herein, a skilled artesian will be able to apply the general principals described herein to sequences of content segments other than that specifically illustrated in FIG. 3.

Point 308 represents a point in time where the broadcast programming 302 and the personalized mediacast 304 are in time synchronization $T_B=T_M=0$.

At time $T_B=T_M=0$, meta data or a marker 314a indicating the beginning of a replaceable non-programming content segment is detected in the broadcast programming 302. The broadcaster 102 (FIG. 1) provides 1:20 of replaceable non-programming content segment 318. The replaceable non-programming content segment 318 may, for example, consist of a plurality of advertisements or commercials.

While the broadcaster 102 broadcasts the 1:20 of replaceable non-programming content segment 318 to the broadcast content consumers 106 (FIG. 1), the personalized mediacast generation system 116 substitutes a first replacement non-programming content segment 320A into the personalized mediacast 204. The first replacement non-programming content segment 320A may, for example, consist of a first advertisement or commercial, which is likely different from the advertisements or commercials of the broadcast programming 302, for example an advertisement or commercial selected based on various non-programming selection criterion.

Having not detected meta data or a marker prior to the end of the first replacement non-programming content segment 320A, the personalized mediacast generation system 116 substitutes a second replacement non-programming content segment 320B into the personalized mediacast 204. Such may, for example, consist of a second advertisement or commercial, again selected based on various non-programming selection criterion.

Again, having not detected meta data or a marker prior to the end of the second replacement non-programming content segment 320B, the personalized mediacast generation system 116 substitutes a third replacement non-programming content segment 320C into the personalized mediacast 204. Such may, for example, consist of a third advertisement or commercial, again selected based on various non-programming selection criterion.

Prior to reaching the end of the third replacement non-programming content segment 320C, the personalized mediacast generation system 116 (e.g., monitor 202) detects meta data or marker 322a indicating the start of a replaceable programming content segment 324, for example at 1:20 in the broadcast programming 202. The personalized mediacast generation system 116 continues to substitute the third replacement non-programming content segment 320C until its end is reached, at 1:25.

Once the end of the third replacement non-programming content segment 320C is reached, at 1:25, personalized mediacast generation system 116 substitutes replacement programming content segments 326 to form the personalized mediacast 304. Thus, two conditions had to be satisfied, the first being that meta data or a marker indicated that a replaceable portion of the broadcast programming 302 had been reached, and the second being that the current content segment being substituted or inserted has finished.

In this example, the broadcaster 102 (FIG. 1) transmits 0:50 of replaceable programming content 224 to the broadcast content consumers 114 (FIG. 1). The replaceable programming content 224 may, for example, consist of a plurality of songs by various artists on the broadcaster's playlist or which are consistent with the broadcaster's genre. While the illustrated example uses certain periods, actual implementations will of course use different periods. For example, replaceable content segments may, for instance, include blocks of three to six songs, which may average 2:30, or some other duration. Thus, the total replaceable programming content period may, for example be between 10 and 15 minutes, rather than the much more abbreviated period (0:50) illustrated.

While the broadcaster 112 (FIG. 1) broadcasts replaceable programming content 224, personalized mediacast generation system 116 substitutes a first replacement programming content segment 326D to generate the personalized mediacast 204. The first replacement programming content segment 226D may, for example, take the form of a song, likely different from the songs of the replaceable programming content 224, for instance a song selected based on mediacast content consumer programming selection criterion.

Having not detected meta data or a marker prior to the end of the replacement programming content segment 326D, the personalized mediacast generation system 116 substitutes a second replacement programming content segment 326E to generate the personalized mediacast 204. The second replacement programming content segment 226E may, for example, take the form of a song, likely different from the songs of the replaceable programming content 224, for instance a song selected based on mediacast content consumer programming selection criterion.

Again, having not detected meta data or a marker prior to the end of the second replacement programming content segment 326E, the personalized mediacast generation system 116 substitutes a third replacement programming content segment 326F to generate the personalized mediacast 118 (FIG. 1). The third replacement programming content segment 226F may, for example, take the form of a song, likely different from the songs of the replaceable programming content 224, for instance a song selected based on mediacast content consumer programming selection criterion.

Prior to reaching the end of the third replacement programming content segment 326F, the personalized mediacast generation system 116 (e.g., monitor) detects meta data or a marker 328a indicating the start of a non-replaceable programming content segment 330, at 2:10 in the broadcast programming 302. The personalized mediacast generation system 116 continues to substitute the third replacement non-programming content segment 326F until its end is reached, at 2:30, The non-replaceable programming content segment 330 is an important part of the broadcast, so cannot be lost. The non-replaceable programming content segment 330 may, for example, comprises news, sports, weather, or traffic reporting, announcer or host discussions, or other content that would be relevant to a wider, geographically diverse audience. Since the non-replaceable programming content segment 330 is marked or identified as being non-replaceable, and since the start of the non-replaceable programming content segment 330 is detected before the personalized mediacast generation system 116 is finished with the third replacement programming content segment 326F, the personalized mediacast generation system 116 starts buffering the non-replaceable programming content segment 330 at 2:10 in the broadcast programming 302. Such is indicated by the gradually increasing slope 327a of buffer time line 306.

Once the end of the third replacement non-programming content segment 326F is reached, at 2:30, the personalized mediacast generation system 116 starts transferring the buffered content from the buffer 206 (FIG. 2) as non-replaceable programming content segment 332 to generate the personalized mediacast 204. At the same time, the personalized mediacast generation system 116 continues to buffer incoming portions of the non-replaceable programming content segment 330 to the buffer 206 (FIG. 2). Thus, the buffer 206 is playing off a front end, while storing to the back end, in a queue like fashion. This is indicated by the essentially flat portion 327b of the buffer time line 306, which assumes the incoming content arrives at the same rate as the outgoing content. Such may or may not be the case in any particular implementation, and may even vary from time to time in a single implementation.

Notably, the non-replaceable programming content segment 232 portion of the personalized mediacast 304 lags the corresponding non-replaceable programming content segment 230 portion of the broadcast programming 302 by 0:20. However, this asynchronicity between the broadcast programming 302 and the personalized mediacast 304 is unnoticed by either the mediacast content consumer 114 (FIG. 1) due to the seamless substitution or insertion of the replacement programming and non-programming content by the personalized mediacast generation system 116.

At 3:25 the personalized mediacast generation system detects meta data or marker 334a in the broadcast programming 302, which is indicative of the start of a replaceable programming content segment 336 in the broadcast programming 302. The personalized mediacast generation system 116 (FIG. 1) continues playing out of the buffer 206 (FIG. 2) until all of the non-replaceable programming content segment 332 has been incorporated into the personalized mediacast 304, at 3:45. This is illustrated as gradually decreasing slope 327c of the buffer time line 306. This empties the last 20 seconds of the buffer, which cuts into the replaceable programming content segment 336 effectively shortening such.

In this illustration, the broadcaster 112 (FIG. 1) transmits 1:15 of replaceable programming content 336 to the broadcast content consumers 106 (FIG. 1). Once the non-replaceable programming content segment 330 has been played from the buffer, the personalized mediacast generation system 116 (FIG. 1) substitutes a first replacement programming content segment 338G to generate the personalized mediacast 304. The first replacement programming content segment 338G may, for example, consist of a song, likely different from the songs of the replaceable programming content 336, for instance a song selected based on mediacast content consumer programming selection criterion.

Having not detected meta data or a marker prior to the end of the first replacement programming content segment 338G, the personalized mediacast generation system 116 (FIG. 1) substitutes a second replacement programming content segment 338H to generate the personalized mediacast 304. The second replacement programming content segment 338H may, for example, consist of a song, likely different from the songs of the replaceable programming content 336, for instance a song selected based on mediacast content consumer programming selection criterion.

Again, having not detected meta data or a marker prior to the end of the replacement programming content segment 238H, the personalized mediacast generation system 116 (FIG. 1) substitutes a third replacement programming content segment 238I into the personalized mediacast 304. The third replacement programming content segment 338H may, for example, consist of a song, likely different from the songs of the replaceable programming content 336, for instance a song selected based on mediacast content consumer programming selection criterion.

Prior to reaching the end of the third replacement programming content segment 338I, the personalized mediacast generation system 116 (FIG. 1) detects meta data or marker 340a, indicating a start of a replaceable non-programming content segment 342 at 4:40 in the broadcast programming 302. The replaceable non-programming content segment 342 may, for example, comprise a number of advertisements or commercials. The illustrated replaceable non-programming content segment 342 is 1;00 minute in length or duration.

Notably, the replacement non-programming content segment 338I ends 0:10 after the personalized mediacast generation system 116 detects the meta data or marker 340a. Recall that the total asynchronicity was 0:20 prior to the current segment. Thus, the asynchronicity has been reduced by 0:10. This occurs inherently through the buffering of certain broadcast programming content which is triggered by detection of meta data or makers, and the unbuffering of buffered content which is triggered by two conditions, that is the occurrence of a next content segment in the broadcast programming, which is indicated by detection of appropriate meta data or markers, and the completion of the substitution of the current replacement content. It can be seen that the system advantageously is able to thereby manage the buffering of broadcast programming content for each of the personalized mediacasts 304 without requiring knowledge of the duration of the replaceable segment within the broadcast programming 302 or knowledge of the duration of the replacement segments used to generate each personalized mediacast 304.

At 4:50 personalized mediacast generation system 116 (FIG. 1) detects meta data or marker 340b, which indicates the end or completion of the third replacement programming content segment 338I. In response, the personalized mediacast generation system 116 (FIG. 1) substitutes a first replacement non-programming content segment 344J to generate the personalized mediacast 304.

Having not detected meta data or a marker prior to the end of the first replacement programming content segment 344J, the personalized mediacast generation system 116 (FIG. 1) substitutes a second replacement non-programming content segment 344K to generate the personalized mediacast 304.

Prior to reaching the end of the second replacement non-programming content segment 344K, the personalized mediacast generation system 116 (FIG. 1) detects meta data or marker 348a, indicating the start of a non-replaceable programming content segment 350 at 5:40 in the broadcast programming 302. The personalized mediacast generation system 116 (FIG. 1) continues to substitute the replacement programming content segment 344K until the replacement programming content segment 344K is complete. During this time personalized mediacast generation system 116 (FIG. 1) buffers the non-replaceable programming content segment 350. Such is indicated by the gradually increasing slope 351a of the buffer time line 306. Notably, two conditions had to be satisfied to trigger the buffering, that is 1) detection of non-replaceable content; and 2) an uncompleted substitution of replacement content, The personalized mediacast generation system 116 (FIG. 1) detects meta data or marker 348b, indicating the replacement programming content segment 344K is complete. This occurs at 5:45, 0:05 after the detection of the meta data or marker 348a. In response, the personalized mediacast generation system 116 (FIG. 1) begins unbuffering or playing or transferring the buffered content out of the buffer 206 (FIG. 2) to generate the personalized mediacast 304. Meanwhile, the personalized mediacast generation system 116 (FIG. 1) continues to buffer portions of the non-replaceable programming content segment 350 as those portions arrive. This simultaneous buffer and unbuffering is illustrated as a flat portion 351b of the buffer time line 306.

Recall that the total asynchronicity was 0:10 prior to the current segment. Thus, the asynchronicity has been reduced by 0:05 to 0:05. The non-replaceable programming content segment 352 portion of the personalized mediacast 304 lags the corresponding non-replaceable programming content segment 350 portion of the broadcast programming 302 by 0:05.

The personalized mediacast generation system 116 (FIG. 1) detects meta data or marker 356a which is indicative of a start of a replaceable non-programming content segment 358, at 6:50. The replaceable non-programming content segment 358 may, for example, take the form of one or more advertisements or commercials. The replaceable non-programming content segment 358 is illustrated as having a length or duration of 1:00 minute. During this time, the personalized mediacast generation system 116 (FIG. 1) is emptying the remaining buffered content, illustrated by the gradually decreasing slope 351c of the buffer time line 306.

The personalized mediacast generation system 116 (FIG. 1) detects meta data or marker 356b which indicates an end of the unbuffering or playing out of the buffered non-replaceable programming content segment 350. In response, the personalized mediacast generation system 116 (FIG. 1) substitutes a first replacement programming content segment 360L to generate the personalized mediacast 304. The first replacement programming content segment 360L may, for example, comprises one or more songs, which may be selected based on mediacast content consumer programming selection criterion. Thus, in contrast to previous substitutions or replacements, in this instance one type of content (i.e., non-programming content) is being replaced by a different type of content (i.e., programming content).

Having not detected meta data or a marker prior to the end of the first replacement programming content segment 360L, the personalized mediacast generation system 116 (FIG. 1) substitutes a second replacement programming content segment 360M to generate the personalized mediacast 304. The second replacement programming content segment 360M may, for example, comprises one or more songs, which may be selected based on mediacast content consumer programming selection criterion. Thus, in contrast to previous substitutions or replacements, in this instance one type of content (i.e., non-programming content) is being replaced by a different type of content (i.e., programming content).

Again, having not detected meta data or a marker prior to the end of the replacement programming content segment 360M, the personalized mediacast generation system 116 (FIG. 1) substitutes a third replacement programming content segment 360N to generate the personalized mediacast 304. The third replacement programming content segment 360N may, for example, comprises one or more songs, which may be selected based on mediacast content consumer programming selection criterion. Thus, in contrast to previous substitutions or replacements, in this instance one type of content (i.e., non-programming content) is being replaced by a different type of content (i.e., programming content).

Prior to reaching the end of the third replacement programming content segment 360N, the personalized mediacast generation system 116 (e.g., monitor 202) detects meta data or marker 362a indicating the start of another segment at 7:50 in the broadcast programming 302. The third replacement non-programming content segment 360N ends 0:10 after the personalized mediacast generation system 116 (FIG. 1) detects meta data or marker 362a. Thus, the current asynchronicity (i.e., the duration of the original broadcast being buffered) is 0:05.

As illustrated above, the personalized mediacast generation system 116 may inherently fluctuate around a certain asynchronicity between the broadcast programming 302 and the personalized mediacast 304. This advantageously prevents accumulation of large amounts of asynchronicity over time. This inherent tendency to self adjust is, at least in part, a result of requiring two conditions to be satisfied before substituting or inserting replacement content, 1) meta data or a marker indicates that a replaceable portion of the broadcast programming 302 had been reached, and 2) the current content segment being substituted or inserted has finished. This allows buffered content to be played out, and a following replaceable content segment be automatically shortened to reduce the asynchronicity, even without any knowledge or concern about the length of the individual pieces of content being substituted during the replaceable content segment. Such provides a particularly elegant solution, allowing complete freedom in content selection, while inherently limiting cumulative asynchronicity. Both replaceable programming and replaceable non-programming segments may be used to reduce the asynchronicity.

Of note, the example illustrated in FIG. 3 assumes that the length or duration of content segments are not known until an end of the respective content segment is reached. In other implementations, the length or duration may be known at the start of a content segment. For example, such may be encoded in the associated meta data or marker. A skilled artisan will be able to apply the concepts described herein to the situation where the length or duration is known at the start, which is an inherently easier task than implementing without such knowledge. In such situations, the new or replacement content may be selected based in part on how closely a fit in length or duration it has to a length or duration of a content segment that it will replace. Such may be determined on an individual basis (e.g., replacement song versus song to be replaced), a cumulative basis (e.g., series of replacement songs versus total length of multi-song segment during which multiple songs are played in the broadcast), or both. For instance, if it is known that there is one 3 minute segment, six 30 second advertisements may be selected, or four 30 second advertisements along with one 1 minute advertisement. Having this knowledge of course simplifies buffering, at the expense of matching lengths or durations.

In an alternative, it may be desirable to ensure that some content segments are not reduced in duration or length. For example, replaceable non-programming content segments may be used to run advertisements or commercials. Reduction of the duration of such may reduce revenue opportunity for a broadcaster or Webcaster 102. Thus, in some implementations some of replaceable segments are not used to reduce asynchronicity. In such implementations the personalized mediacast generation system 116 may extend a length or duration of a replacement content segment sufficiently to assure that such is at least as long as a length or duration of the corresponding content segment in the broadcast or Webcast. In some instance, the replacement content segment will be longer, for example where a piece of replacement content must be completely played out so extends the transition to non-replaceable content. Other replaceable content segments (e.g., replaceable programming content segments) may be used to reduce asynchronicity. Such may even be implemented dynamically. For example, the personalized mediacast generation system 116 determines whether an asynchronicity exceeds some threshold value, If the asynchronicity does not exceed the threshold value, the personalized mediacast generation system 116 lengthens the replacement content segment in the personalized mediacast to ensure it is at least as long as the corresponding replaceable content segment in the broadcast programming. If the asynchronicity does exceed the threshold value, the personalized mediacast generation system 116 uses the replacement content segment in the personalized mediacast to reduce the asynchronicity between the personalized mediacast and the broadcast programming.

Further, as used herein and in the claims, the term substitute and variations of such are not limited to one for one substitutions, but generally refer to a partial or even total replacement of some content for some other content to generate the personalized mediacast 118 (FIG. 1).

Replacement Non-Programming Content, Data Structures and Storage Media

Various nontransitory media discussed above may store information such as data in one or more data structures. Data structures may take a variety of forms, for replacement programming and non-programming content segment inventory, records associated with relational databases, a database itself, lookup tables, etc. The data structures may store a variety of different information or data.

A data structure may store replacement non-programming content segments such as advertisement related information in the form of a record with a variety of fields. In addition to the replacement non-programming content segments the data structure may store replacement programming content segments such as entertainment content related information also in the form of a record with a variety of fields.

The data structure may store a replacement non-programming content segment identifier that uniquely identifies the replacement non-programming content segment. The data structure may store a medium identifier that identifies a type of medium in which the replacement non-programming content segment may run. The medium identifier may, for example, specify one or more of radio, television, Web, etc. mediums. The data structure may store a duration indication that specifies the duration of the associated replacement non-programming content segments. The data structure may store advertiser replacement non-programming content segment identifier that uniquely identifies an advertiser to which the replacement non-programming content segments are related or owned. The data structure may store a markets identifier that identifies one or more geographic markets (e.g., NYC, Pacific Northwest, Seattle) or other markets (e.g., high technology, industrial supply) to which the replacement non-programming content segments are targeted. The data structure may store a language identifier that identifies a language (e.g., English, Spanish) of the replacement non-programming content segments.

The data structure may store general population demographic information that specifies the demographics of the mediacast content consumers 114 (FIG. 1) to which the replacement non-programming content segments are targeted. The general population demographic information may include a large variety of information, for example, gender(s) (e.g., male, female, both), age(s) (e.g., 21-30 year olds), incomes (e.g., over $50,000 per year). Other or different generalized population demographic information may be employed.

The data structure may store specific demographic information that specifies the demographics of all or a portion of the mediacast content consumer audience, or individual mediacast content consumers 114 to which the replacement non-programming content segments are targeted or may be of particular interest. Such may be useful where information for particular mediacast content consumers 114 have been collected, for instance, automatically collected or collected via self-reporting by those mediacast content consumers. The specific demographic information may include a large variety of information. The specific demographic information may, for example, indicate a current location of a mediacast content consumer 114. The current location may be a fairly specific geographic location (e.g., Zip or other postal code), which may be discernible, for example, from an Internet address, telephone area code and prefix, or from cellular location information. The current location may represent a type of location, for example, fixed or mobile, which may, for instance, be discerned from an Internet address or device type (e.g., Smartphone operating on cellular system versus operating on WI-FI, satellite radio, DSL line). The specific demographic information may, for example, provide an indication of the mediacast content consumer device used by the mediacast content consumer 114. For instance, the device type may indicate a general device type (e.g., computer, tablet, Smartphone), or a more specific device type (e.g., manufacturer and model). Such may be determined, for example, by querying or polling the mediacast content consumer device. The specific demographic information may, for example, indicate a bandwidth or service level available to an individual. Available bandwidth or service level may be discernible from the type of communications infrastructure involved, (e.g., cellular, WI-FI, DSL, cable modem) or device type.

The specific demographic information may, for example, include self reported demographic information. Such may include information that is not readily discernible without self reporting. The self reported specific demographic information may, for example, indicate a gender of a particular mediacast content consumer 114. The self reported specific demographic information may, for example, indicate an actual age of the mediacast content consumer 114 (e.g., 47 years old). The self reported specific demographic information may, for example, indicate an income of a mediacast content consumer 114 (e.g., $50,000 per year). The self reported specific demographic information may, for example, indicate an occupation of the mediacast content consumer 114 (e.g., engineer, salesperson). The self reported specific demographic information may, for example, indicate interests of an mediacast content consumer 114 (e.g., pilot, snorkeling, leisure reading). The self reported specific demographic information may, for example, indicate media preferences of a mediacast content consumer 16 (e.g., certain periodicals, television or radio shows or stations).

A data structure may store replacement non-programming content segments in the form of a record with a variety of fields. The data structure may store a replacement non-programming content segment identifier that uniquely identifies a replacement non-programming content segment. The data structure may store replacement non-programming content segments. The advertisement content may take a variety of forms, for example, audio files, video files, WebPages, banners, popup, or pop files. The advertisement content may be formed in any of a large variety of formats, for example, AVI, DivX, MPEG, SVCD, VCD, WMV, XVCD, XSVCD, MP3 files, MP4 files, HTML files, XML, Flash®, AAC, .mov, H.264, MKV files, etc.

A data structure may store replaceable non-programming content segment related information in the form of a record with a variety of fields. The data structure may store a replaceable non-programming content segment opportunity identifier that uniquely identifies a replaceable non-programming content segment placement opportunity. Such may correspond to an available segment or sub segment of programming. The data structure may store a medium identifier that identifies a type of medium in which the replacement non-programming content segments may run. The medium identifier may, for example, specify one or more of radio, television, Web, etc. mediums. The data structure may store a duration indication that specifies the duration (e.g., 15 seconds, 30 seconds, 60 seconds) of the available replaceable non-programming content segment opportunity. The data structure may store a date or time identifier that uniquely identifies a date and/or time of the available replaceable non-programming content segment placement opportunity. Such may specify date by day of year, by day of week, or season. Time may be specified in any desired time zone, for example, a time zone in which the originating broadcast or Webcast programming will be broadcast. The data structure may store a guaranteed indication that specifies whether a content provider ensures that a replacement non-programming content segment if placed for the respective available replaceable non-programming content segment opportunity is guaranteed to be broadcast, assuming the advertisement meets any guidelines or conditions applied by the respective content provider to advertising in its programming. The data structure may store a content provider identifier that specifies a content provider identifier that uniquely identifies a content provider (e.g., KUOW, WNEW, ABC, WABC, TBS) which will be broadcasting or otherwise transmitting the programming. The data structure may store a markets identifier that identifies one or more geographic markets (e.g., NYC, Pacific Northwest) or other markets (e.g., high technology, industrial supply) to which the replacement non-programming content segment is targeted. The data structure may store a language identifier that identifies a language (e.g., English, Spanish) of the programming associated with the available replaceable non-programming content segment opportunity. It is likely that an advertiser will employ the same language for an replacement non-programming content segment as the language of the main programming since the audience may be expected to understand that language. The data structure may store general population demographic information that specifies the demographics of the generally audience(s) to which the programming and/or the content provider's broadcasting or Webcasting is targeted. The general population demographic information may include a large variety of information, for example, gender(s) (e.g., male, female, both), age(s) (e.g., 21-30 year olds), incomes (e.g., over $50,000 per year). Other or different generalized population demographic information may be employed.

The data structure may store specific demographic information that specifies the demographics of all or a portion of the mediacast content consumer audience, or individual mediacast content consumers 114 to which the broadcaster or Webcaster's programming or the content provider's broadcasting or Webcasting is targeted. Such may be useful where information for particular mediacast content consumers in an audience have been collected, for instance, automatically collected or collected via self-reporting by those mediacast content consumers 114. The specific demographic information may include a large variety of information.

The specific demographic information may, for example, indicate a current location of a mediacast content consumer 114 (FIG. 1). The current location may be a fairly specific geographic location, which may be discernible, for example, from an Internet address, telephone area code and prefix, or from cellular location information. The current location may represent a type of location, for example, fixed or mobile, which may, for instance, be discerned from an Internet address or device type (e.g., Smartphone operating on cellular system versus operating on WI-FI, satellite radio, DSL line). The specific demographic information may, for example, indicate a device type employed by a mediacast content consumer 114. For instance, the device type may indicate a general device type (e.g., computer, tablet, Smartphone), or a more specific device type (e.g., manufacturer and model). Such may be determined, for example, by querying or polling the device. The specific demographic information may, for example, indicate a bandwidth or level of service available to a mediacast content consumer 114. Available bandwidth may be discernible from the type of communications infrastructure involved, (e.g., cellular, WI-FI, DSL, cable modem) and/or device type.

The specific demographic information may, for example, include self reported demographic information. Such may include information that is not readily discernible without self reporting. The self reported specific demographic information may, for example, indicate a gender of a mediacast content consumer 114. The self reported specific demographic information may, for example, indicate an actual age of the mediacast content consumer 114 (e.g., 47 year old). The self reported specific demographic information may, for example, indicate an income of a mediacast content consumer 114 (e.g., $50,000 per year). The self reported specific demographic information may, for example, indicate an occupation of the mediacast content consumer 114 (e.g., engineer, salesperson). The self reported specific demographic information may, for example, indicate interests of a mediacast content consumer 114 (e.g., pilot, snorkeling, leisure reading). The self reported specific demographic information may, for example, indicate media preferences of a mediacast content consumer 114 (e.g., certain periodicals, television or radio shows or stations).

Replacement Programming Content, Data Structures and Storage Media

A data structure may store replacement programming content segments such as entertainment related information (e.g., talk shows, music, pre-recorded live content, etc.) in the form of a record with a variety of fields. The data structure may store a replacement programming content segment identifier that uniquely identifies the replacement programming content segment. The data structure may store a medium identifier that identifies a type of medium in which the replacement programming content segment may run. The medium identifier may, for example, specify one or more of radio, television, Web, etc. mediums. The data structure may store a duration indication that specifies the duration of the associated replacement programming content segments. The data structure may store a replacement non-programming content segment identifier that uniquely identifies the artist, group, or performer to which the replacement non-programming content segments are related or attributed. The data structure may store a market identifier that identifies one or more geographic markets (e.g., NYC, Pacific Northwest, Seattle) or other market segments (e.g., conservative talk, progressive talk, entertainment industry, etc.) to whom the replacement programming content segments are targeted or may be of potential interest. The data structure may store a language identifier that identifies the primary language content (e.g., English, Spanish) of the replacement programming content segments.

The data structure may store general population demographic information that specifies the demographics of the mediacast content consumers 114 to whom the replacement programming content segments may be of interest. The general population demographic information may include a large variety of information, for example, gender(s) (e.g., male, female, both), age(s) (e.g., 21-30 year olds), income(s) (e.g., over $50,000 per year). Other or different generalized population demographic information may be employed.

The data structure may store specific demographic information that specifies the demographics of all or a portion of the mediacast content consumer audience, or individual mediacast content consumers 114 to whom the replacement programming content segments are targeted or may be of particular interest. Such may be useful where information for particular mediacast content consumers 114 have been collected, for instance, automatically collected or collected via self-reporting by those mediacast content consumers. The specific demographic information may include a large variety of information. The specific demographic information may, for example, indicate a current location of a mediacast content consumer. The specific demographic information may be based in whole or in part upon the proximity of one mediacast content consumer 114 to other mediacast content consumers 114 (enabling, for example, the delivery of replacement programming content segments based upon what other mediacast content consumers in the area are receiving). The current location may be a fairly specific geographic location, which may be discernible, for example, from an Internet address, telephone area code and prefix, or from cellular location information. The current location may represent a type of location, for example, fixed or mobile, which may, for instance, be discerned from an Internet address or device type. The specific demographic information may, for example, provide an indication of the mediacast content consumer device used by the mediacast content consumer 114.

For instance, the device type may indicate a general device type (e.g., computer, tablet, Smartphone), or a more specific device type (enabling, for example, delivery of high definition replacement programming content segments on devices amenable to HD format while conserving bandwidth by delivery standard definition replacement programming content segments on devices incapable of rendering an HD format). Such may be determined, for example, by querying or polling the mediacast content consumer device. The specific demographic information may, for example, indicate a bandwidth or service level available to an individual. Available bandwidth or service level may be discernible from the type of communications infrastructure involved, (e.g., cellular, WI-FI, DSL, cable modem) or device type.

Other items that could be stored in the replacement programming content records include song-specific information or data such as tempo, tonal qualities, current popularity, related artists, related songs, and/or genres.

In some instances, replacement programming content segments are selected based at least in part upon the mediacast content consumer replacement programming content selection criterion 215 (FIG. 2) communicated by each of the respective mediacast content consumers 114 to the broadcaster or Webcaster 102 (FIG. 1). The content consumer replacement programming content selection criterion 215 can include a value indicative at least one of: a song, a musical artist, a performing artist, a dramatic artist, a musical group, an album, a musical work, a theatric work, a film work, or a television work, comedy or sketch, etc. In some embodiments, the mediacast content consumer 114 can access only a limited repository of replacement programming content segments based upon a broadcaster or Webcaster supplied playlist that may be based upon pre-approved or pre-determined replacement programming content selected by the broadcaster or Webcaster, for example in keeping with a genre or artist consistent with the playlist or brand of the broadcaster or Webcaster.

A data structure may store replacement programming content segments in the form of a record with a variety of fields. The data structure may store a replacement programming content segment identifier that uniquely identifies a replacement programming content segment. The data structure may store replacement programming content segments. The replacement programming content segments may take a variety of forms, for example, audio files, video files, WebPages, banners, popup, or pop files. The replacement programming content segments may be formed in any of a large variety of formats, for example, AVI, DivX, MPEG, SVCD, VCD, WMV, XVCD, XSVCD, MP3 files, MP4 files, HTML files, XML, Flash®, AAC, .mov, H.264, MKV files, etc. In at least some embodiments the data structure can incorporate legal requirements regarding the transmission of replacement programming content segments in order to comply with national or international law, for example the Digital Millennium Copyright Act (DMCA) within the United States. The above examples of data structures and examples of specific types of information are intended to be illustrative and not limiting. In some instances, additional information may be employed and some of the illustrated information omitted. Also, different data structures may be employed and/or the information may be stored in different data structures or different ways. For example, a separate content provider specific data structure may be employed to store information related to respective content providers. Also for example, a separate advertiser data structure may be employed to store information related to respective advertisers.

Specific Examples of Operation

Figure 4A:
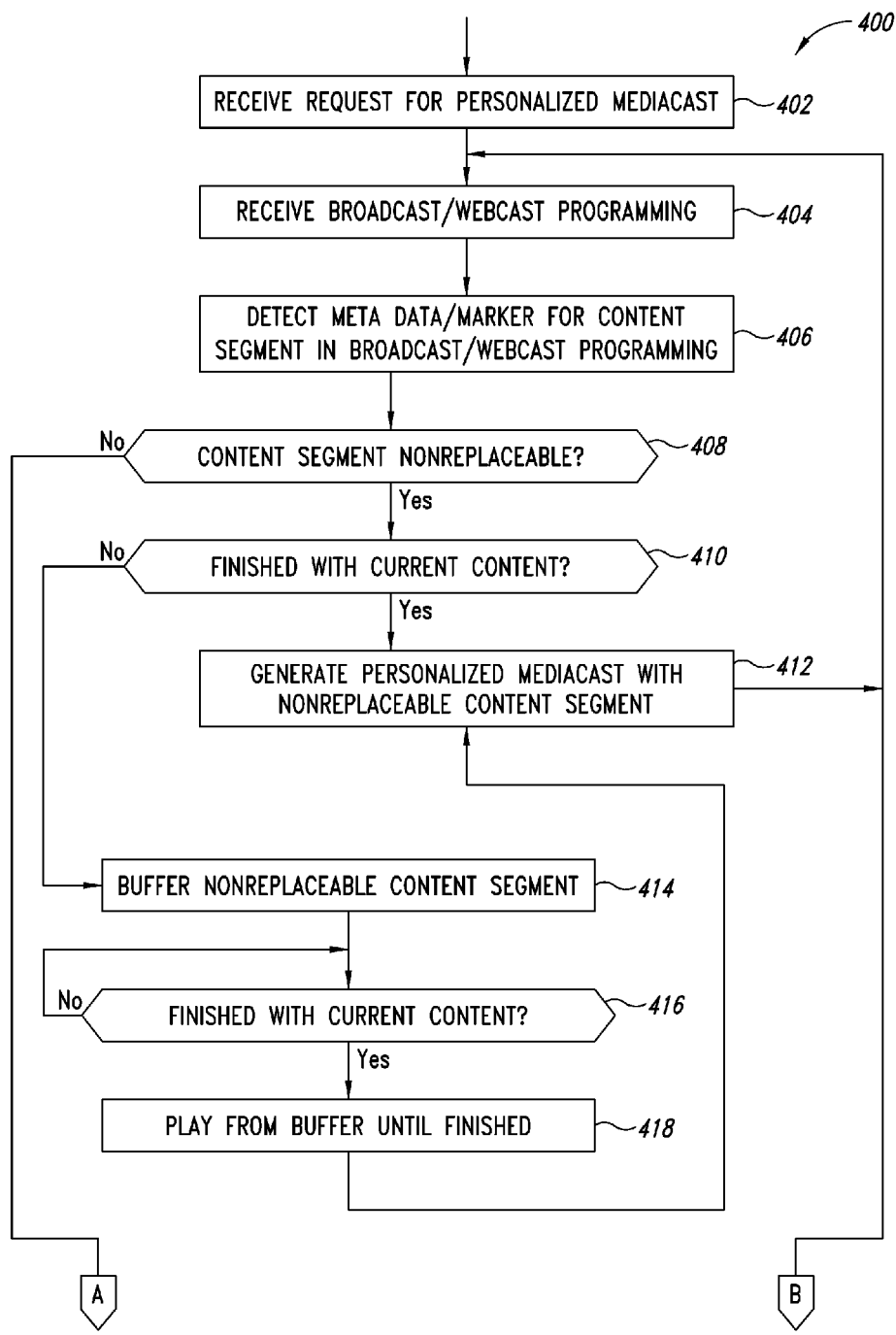
FIGS. 4A and 4B show a method of operating a personalized mediacast generation system to provide a plurality of personalized mediacasts to a respective plurality of mediacast content consumers in a networked environment, according to one illustrated embodiment.
Figure 4B:
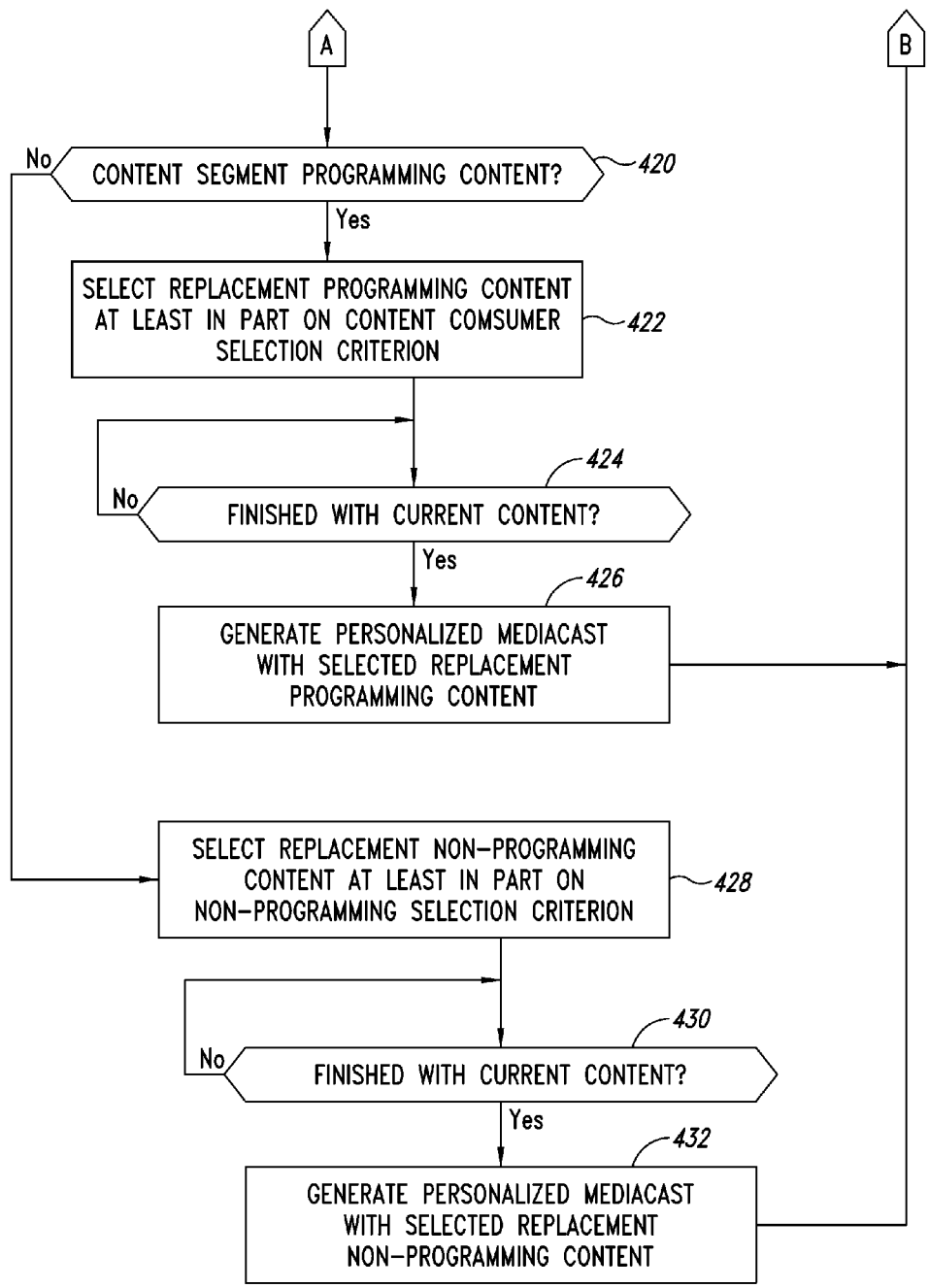

FIGS. 4A and 4B show a method 400 of operating one or more components of a personalized mediacast generation system to provide personalized mediacasts 118 (FIG. 1) to mediacast content consumers 114 in a networked environment 100, according to one illustrated embodiment.

At 402, a component receives a request for a personalized mediacast. The request may, for example be received directly or indirectly from a mediacast content consumer 114. Included with each of the plurality of mediacast content requests can be one or more content consumer selection criterion. The content consumer selection criterion includes one or more values indicative of replacement programming content desired by the mediacast content consumer 114. Such may include values of a type of programming content that interests the mediacast content consumer 114, for instance values indicative of a performer or artist, band, song, album, title, show, comedian, genre, etc.

Optionally, the content consumer selection criterion may include one or more values indicative of replacement non-programming content relevant to the mediacast content consumer 114. Such may, for example, include demographic values associated with the mediacast content consumer 114.

Broadcast or Webcast programming 112 (FIG. 1) typically includes a plurality of replaceable programming content segments, replaceable non-programming content segments, and non-replaceable programming content segments. For example, local or regional advertising content contained within the original broadcast or Webcast programming 112 may be identified as replaceable non-programming content while the primary subject matter, content or entertainment within the original broadcast or Webcast programming 112 may be identified as either replaceable or non-replaceable programming content segments. Such may be identified by meta data or a marker or other indicator associated with the respective content segment, for example embedded within the content segment itself or within the broadcast or Webcast programming 112 (FIG. 1).

At 404, the personalized mediacast generation system 116 (FIG. 1) receives the original broadcast or Webcast programming 112. The original broadcast or Webcast programming 112 typically includes sequential replaceable and non-replaceable programming and non-programming content segments, which may appear in any order. Metadata or a marker is typically associated with each content segment contained within the original broadcast or Webcast programming 112. The associated metadata or marker may identify a start and/or end of a content segment and/or a duration thereof. The associated metadata or maker may also specify whether a given content segment is replaceable or non-replaceable. The associated meta data or marker may also specify whether a given content segment is programming content (e.g., music) or non-programming content (e.g., advertisements). Thus, the meta data or maker may specify whether a given content segment is 1) replaceable programming content, 2) non-replaceable programming content, 3) replaceable non-programming content, or 4) non-replaceable non-programming content.

At 406, the personalized mediacast generation system 116 (FIG. 1) detects metadata or a marker indicative of a start of a content segment. Many techniques for detecting meta data or markers may be employed.

At 408, the personalized mediacast generation system 116 (FIG. 1) determines whether the content segment in the broadcast or Webcast programming 112 is Non-replaceable. In particular, the personalized mediacast generation system 116 may determine such from the meta data or marker associated with the respective content segment in the broadcast or Webcast 112. Non-replaceable content is typically content that is important to the broadcast. Such may, for example, include news, sports reports, host commentary, etc. Notably, this act or operation does not need to distinguish between programming content and non-programming content since the personalized mediacast generation system 116 may treat both in the same manner, so long as the content is considered Non-replaceable.

If the personalized mediacast generation system 116 determines that the content segment is Non-replaceable, then the personalized mediacast generation system 116 determines whether a current or most recent content has been processed or is finished at 410. As best illustrated in FIG. 3, the personalized mediacast generation system 116 may not have finished with previous content when a new content segment starts in a broadcast or Webcast 112. Thus, the personalized mediacast generation system 116 checks to determine that such is finished.

If the personalized mediacast generation system 116 determines whether that the current or most recent content has been processed or is finished, then the personalized mediacast generation system 116 (FIG. 1) generates a portion of the personalized mediacast with the content of the Non-replaceable content segment at 412. For example, the personalized mediacast generation system 116 may stream the non-replaceable content to the mediacast content consumer 114. Alternatively, the personalized mediacast generation system 116 may cause the non-replaceable content to be provided to the mediacast content consumer 114 indirectly, for example via caching such with a CDN 122. Further, the personalized mediacast generation system 116 may encode, or cause the encodation, of the non-replaceable content as fragments, and store or cause such to be stored, allowing retrieval according to a manifest which the personalized mediacast generation system 116 may also generate and supply to the mediacast consumer 114. In some implementations such may be accomplished by controlling a switch (e.g., audio, video) to selectively communicatively couple an output between two or more inputs or sources. The inputs may take the form of two or more communicative paths, for instance serial paths or parallel paths. The sources may include, a broadcast or Webcast feed, one or more repositories of replacement content, and/or the buffer. The repositories of replacement content may, for example, include one repository for new or replacement programming content, and another repository for new or replacement non-programming content. Control then returns to 404 to process further content segments.

If the personalized mediacast generation system 116 determines whether that the current or most recent content has been processed or is finished, then the personalized mediacast generation system 116 (FIG. 1) starts buffering the non-replaceable content at 414. This prevents non-replaceable content from the broadcast or Webcast from being lost while prior content is still being substituted, played, inserted or otherwise included in generating the personalized mediacast 118.

As discussed above, there are various techniques for buffering or otherwise not requiring the duration of replacement programming and non-programming content segments to equal the duration of replaceable programming and non-programming content segments replaced. Yet in some instances, it may be beneficial to at least approximate a match in duration. In other instances, it may be desirable to find a match be a lag or lead of the content in the personalized mediacast 118 (FIG. 1) relative to the original broadcast or Webcast programming 112 to reduce or minimize or even eliminate any asynchronicity existent between some or all of the personalized mediacasts 118 and the original broadcast or Webcast programming 112.

At 416, the personalized mediacast generation system 116 again determines whether the current or most recent content has been processed or is finished. If not, the determination at 416 is repeated until the current or most recent content has been processed or is finished. This implements a wait loop. The personalized mediacast generation system 116 may execute a wait act or operation as part of the wait loop, pausing between determinations to allow time for completion of the process. In the mean time the replacement content is being played, delivered or combined into the personalized mediacast.

If the personalized mediacast generation system 116 determines that the current or most recent content has been processed or is finished, then personalized mediacast generation system 116 starts transmitting or playing buffered content (i.e., unbuffering) from the buffer at 418.

The personalized mediacast generation system 116 uses the content from the buffer to generate the personalized mediacast at 412. Generation of the personalized mediacast is discussed above in reference to 412.

If the personalized mediacast generation system 116 determines at 408 that the content segment is replaceable, then the personalized mediacast generation system 116 determines whether the content segment is a programming content segment at 420. In particular, the personalized mediacast generation system 116 may determine such from the meta data or marker associated with the respective content segment in the broadcast or Webcast 112. Programming content is typically the primary or main subject of the broadcast. Such may, for example, include music, comedy sketches, talk segments, etc. Notably, this act or operation distinguishes between programming content and non-programming content since the personalized mediacast generation system 116 may treat each differently, for example selecting new or replacement content differently.

At 422, the personalized mediacast generation system 116 (FIG. 1) selects replacement programming content based at least in part on content consumer selection criterion associated the respective content consumer for whom the personalized mediacast 118 is being generated. The content consumer selection criterion may be selected by the mediacast content consumer themselves. For example, the mediacast content consumer may provide indications of programming content in which they are interested. Such can take a large variety of forms, for example an identity of a song, an artist or band or other performer (e.g., comedian, host), a show, a sketch or a video, In some implementations, rather than being supplied directly by the mediacast content consumer 114, the content consumer selection criterion may be discerned indirectly from various pieces of information logically associated with the specific mediacast content consumer. Such information may, for example, be representative of a particular device (e.g., computer, Smartphone, tablet, netbook, ultraportable, or similar electronic device associated with the mediacast content consumer 16) or individual. Various types of information (e.g., browsing history, purchasing or buying history, self reported, demographic, geographical) are discussed throughout this disclosure and will not be repeated here in the interest of brevity.

At 424, the personalized mediacast generation system 116 determines whether a current or most recent content has been processed or is finished. As best illustrated in FIG. 3, the personalized mediacast generation system 116 may not have finished with previous content when a new content segment starts in a broadcast or Webcast 112. Thus, the personalized mediacast generation system 116 checks to determine that such is finished.

If the personalized mediacast generation system 116 determines that the current or most recent content has not been processed or is finished at 424, then the determination at 424 is repeated until the current or most recent content has been processed or is finished. This implements a wait loop. The personalized mediacast generation system 116 may execute a wait act or operation as part of the wait loop, pausing between determinations to allow time for completion of the process.

If the personalized mediacast generation system 116 determines that the current or most recent content has been processed or is finished, then at 426 the personalized mediacast generation system 116 (FIG. 1) generates a portion of the personalized with the new or replacement programming content selected at 422. Various methods to implement such have been discussed, for instance in reference to 412 above, so will not be repeated here in the interest of brevity. In this case, a switch may selectively communicatively couple an output to a repository of new or replacement programming content. Control then returns to 404 to process further content segments.

If the personalized mediacast generation system 116 determines at 420 that the content segment is not programming content, then the personalized mediacast generation system 116 selects replacement non-programming content based at least in part on non-programming content selection criterion at 428.

The non-programming content selection criterion may be selected or supplied by one or more different entities. For example, the non-programming content selection criterion may be selected or supplied by advertisers, advertising agencies, advertising networks, Also for example, the non-programming content selection criterion may be selected or supplied by broadcasters, As a further example, the non-programming content selection criterion may be selected or supplied by the mediacast content consumer. For example, the mediacast content consumer may provide indications of non-programming content (e.g., advertisements) in which they are interested.

Various types of non-programming content selection criterion for targeting non-programming content (e.g., advertisements) to individual or groups of mediacast content consumers are discussed throughout this disclosure and will not be repeated here in the interest of brevity.

At 430, the personalized mediacast generation system 116 determines whether a current or most recent content has been processed or is finished. As best illustrated in FIG. 3, the personalized mediacast generation system 116 may not have finished with previous content when a new content segment starts in a broadcast or Webcast 112. Thus, the personalized mediacast generation system 116 checks to determine that such is finished.

If the personalized mediacast generation system 116 determines that the current or most recent content has not been processed or is finished at 430, then the determination at 430 is repeated until the current or most recent content has been processed or is finished. This implements a wait loop. The personalized mediacast generation system 116 may execute a wait act or operation as part of the wait loop, pausing between determinations to allow time for completion of the process.

If the personalized mediacast generation system 116 determines that the current or most recent content has been processed or is finished, then at 432 the personalized mediacast generation system 116 (FIG. 1) generates a portion of the personalized with the new or replacement non-programming content selected at 428. Various methods to implement such have been discussed, for instance in reference to 412 above, so will not be repeated here in the interest of brevity. In this case, a switch may selectively communicatively couple an output to a repository of new or replacement non-programming content. Control then returns to 404 to process further content segments.

While not illustrated in FIGS. 4A and 4B, the personalized mediacast generation system 116 may optionally dynamically generate, or cause to be generated, a respective manifest for each request for a personalized mediacast. The personalized mediacast generation system 116 may additionally or alternatively, optionally fragment or cause to be fragmented the content constituting the personalized mediacast. The personalized mediacast generation system 116 may additionally or alternatively, optionally cause the fragments to be cached, for example by one or more CDNs.

Modifications

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other systems, not necessarily the exemplary system generally described above.

For instance, network and even non-networked topologies other than those illustrated and/or described may be employed. The personalized mediacast generation system may be co-located with the broadcasters or Webcasters or located remotely from the broadcasters or Webcasters, or for example "in the cloud." As noted above, the personalized mediacast generation system may detect replaceable programming or non-programming content segments within the original broadcast or Webcast programming which may directly or indirectly trigger substitution or insertion of new or replacement programming or non-programming content segments to generate the personalized mediacast.

The metadata may simply specify characteristics of the replaceable programming or non-programming content segments which are being replaced, for example specifying a start time, stop time, duration, genre, language, and/or demographic market. A personalized mediacast generation system may use the information, as well as additional information specific to the mediacast content consumer to identify or retrieve the new or replacement programming content and/or new or replacement non-programming content.

The personalized mediacast generation system may be triggered by, or otherwise employ, the metadata to retrieve new or replacement programming and/or new or replacement non-programming content segments. As discussed in detail above, the replacement programming content segments may be selected based at least in part upon a content consumer specific selection criterion, and may additionally be based at least in part upon a playlist or similar approved programming content associated with the broadcaster or Webcaster.

The personalized mediacast generation system may include server computer systems that retrieve the new or replacement programming or new or replacement non-programming content from a variety of different sources. Replacement non-programming content segments may be sourced from an advertiser network server computer system, an advertising network, and/or a third party advertisement aggregator. As previously explained, the replacement non-programming content segments may be targeted to the intended audience of personalized mediacast content consumers, or even an individual personalized mediacast content consumer and/or may be selected based on various external factors, as well as to maximize revenue generation.

In some implementations, replacement programming or non-programming content segments may be inserted or substituted in the programming at a mediacast content consumer device, for example by a media player executing on the mediacast content consumer device. This occurs downstream of the personalized mediacast generation system 116. In contrast, the replacement programming or non-programming content segments may be inserted or substituted in the programming at the personalized mediacast generation system, upstream from the content consumer device. At least some of the implementations described herein may take a server side approach. Taking a server side approach advantageously avoids the need to customize client code for each different mediacast content consumer device, while still providing personalized mediacast capabilities personalized mediacast media players. Depending on the approach taken, a client-side layer could still be added on top of the server-side layer to provide even more level of targeting detail and flexibility.

The implementations described herein can work with all current and future manifest protocols. Examples of current manifest protocols include: M3U8 (Apple HLS), ISML (MSFT Smooth), F4M (Adobe "San Jose"). An example of a possible future manifest protocol includes MPEG DASH or other follow on iterations.

The foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs) or programmable gate arrays. However, those skilled in the art will recognize that the embodiments disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

Various methods and/or algorithms have been described. Some or all of those methods and/or algorithms may omit some of the described acts or steps, include additional acts or steps, combine acts or steps, and/or may perform some acts or steps in a different order than described. Some of the method or algorithms may be implemented in software routines. Some of the software routines may be called from other software routines. Software routines may execute sequentially or concurrently, and may employ a multi-threaded approach.

In addition, those skilled in the art will appreciate that the mechanisms taught herein are capable of being distributed as a program product in a variety of forms, and that an illustrative embodiment applies equally regardless of the particular type of signal bearing media used to actually carry out the distribution. Examples of nontransitory signal bearing media include, but are not limited to, the following: recordable type media such as portable disks and memory, hard disk drives, CD/DVD ROMs, digital tape, computer memory, and other non-transitory computer-readable storage media.

The various embodiments described above can be combined to provide further embodiments. To the extent that they are not inconsistent with the specific teachings and definitions herein, U.S. patent application Ser. No. 11/958,143, published as Publication No. 2008-0120638, U.S. provisional patent application Ser. No. 61/561,186 filed Nov. 17, 201; U.S. provisional patent application Ser. No. 61/587,475 filed Jan. 17, 2012; and U.S. provisional patent application Ser. No. 61/611,403 filed Mar. 15, 2012 are each incorporated herein by reference, in their entireties. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of providing content to a plurality of content consumers, comprising:

receiving at least a portion of a broadcast or a Webcast generated by either of a broadcaster or a Webcaster, the broadcast or the Webcast at least including:

a plurality of non-replaceable programming content segments, a plurality of replaceable programming content segments, and a plurality of replaceable non-programming content segments;

receiving a request from each of the plurality of content consumers for a respective personalized mediacast;

for each of the requested personalized mediacasts, selecting a number of replacement programming content segments based at least in part on at least one content consumer selected content consumer replacement programming selection criterion logically associated with a respective one of the plurality of content consumers;

for each of the requested personalized mediacasts, selecting a number of replacement non-programming content segments based at least in part on a replacement non-programming selection criterion;

generating the personalized mediacast for each of the received requests, each of the personalized mediacasts at least including: the plurality of non-replaceable programming content segments from the broadcaster or Webcaster, the respective selected replacement programming content segments, and the respective selective replacement non-programming content segments;

detecting a start of a given non-replaceable programming content segment of the broadcast or Webcast;

determining that a processing of previous content segment to generate a respective one of the personalized mediacasts is not complete; and in response, buffering the given non-replaceable programming content segment of the broadcast or Webcast for the one of the respective personalized mediacasts.

2. The method of claim 1 wherein receiving a request from each of the respective plurality of content consumers includes receiving the requests which each include at least one value indicative of the at least one content consumer selected content consumer programming selection criterion.

3. The method of claim 2 wherein receiving the requests which each include at least one value indicative of the at least one content consumer selected content consumer programming selection criterion includes receiving the requests with at least one value indicative at least one of: a song, a musical artist, a performing artist, a dramatic artist, a musical group, an album, a musical work, a theatric work, a film work, or a television work.

4. The method of claim 3 wherein the selecting a number of replacement programming content segments includes selecting the replacement programming content segments based on the replacement programming content segment satisfying both the respective content consumer selected content consumer programming selection criterion and a broadcaster or Webcaster programming playlist.

5. The method of claim 1 wherein selecting a number of replacement programming content segments includes selecting the number of replacement programming content segments based at least in part on at least one broadcaster or Webcaster programming selection criterion.

6. The method of claim 1 wherein selecting a number of replacement non-programming content segments includes selecting the replacement non-programming content segments based on at least one of: a market demographic value associated with the respective one of the plurality of content consumers or a geographic value associated with the respective one of the plurality of content consumers.

7. The method of claim 6 wherein selecting a number of replacement non-programming content segments includes selecting the replacement non-programming content segments based on at least one of: a market demographic value associated with the replacement non-programming content segment by a third party; a geographic value associated with the replacement non-programming content segment by a third party; a respective content consumer prior purchase history value associated with the replacement non-programming content segment by a third party; a respective content consumer replacement programming content segment value associated with the replacement non-programming content segment by a third party; a respective content consumer self-reported attribute value associated with the replacement non-programming content segment by a third party, or demographic properties which characterize a respective content consumer.

8. The method of claim 1 wherein selecting a number of replacement non-programming content segments includes selecting the replacement non-programming content segments based on at least one of: a prior purchase value associated with the respective one of the plurality of content consumers; an Internet Protocol address associated with the respective one of the plurality of content consumers; a result of a survey of non-programming content segments associated with other content consumers within a delineated area of the respective one of the plurality of content consumers; a result of a survey of programming content segments associated with other content consumers with whom the respective one of the plurality of content consumers has indicated an association; a result of a survey of purchases associated with other content consumers with whom the respective one of the plurality of content consumers has indicated an association; and at least one self-reported value associated with respective one of the plurality of content consumers.

9. The method of claim 1 wherein selecting a number of replacement non-programming content segments includes selecting the replacement non-programming content segments based on at least one of: an income value associated with the replacement non-programming content segment; a public service value associated with the replacement non-programming content segment; and a legal obligation value associated with the replacement non-programming content segment.

10. The method of claim 1, further comprising:
detecting a start of another non-replaceable programming content segment of the broadcast or Webcast;
determining that a processing of a previous content segment with respect to the other non-replaceable programming content segment to generate a respective one of the personalized mediacasts is complete; and
in response, incorporating the other non-replaceable programming content segment of the broadcast or Webcast into one of the respective personalized mediacasts.

11. The method of claim 1, further comprising:
determining that the processing of previous content segment to generate the respective one of the personalized mediacasts has completed;
in response, delivering the given non-replaceable programming content segment of the broadcast or Webcast from the buffer; and
incorporating the given non-replaceable programming content segment of the broadcast or Webcast into one of the respective personalized mediacasts.

12. The method of claim 11, further comprising:
continuing to buffer a portion of the given non-replaceable programming content segment of the broadcast or Webcast in the buffer while delivering another portion of the given non-replaceable programming content segment of the broadcast or Webcast from the buffer.

13. The method of claim 1, further comprising:
apportioning at least some of the respective personalized mediacasts into a plurality of fragments; and
causing the plurality of fragments to be cached on a content delivery network.

14. The method of claim 1, further comprising:
apportioning at least some of the respective personalized mediacasts into a plurality of fragments; and
causing the plurality of fragments to be cached on a content delivery network; and
indexing the location of each of the plurality of fragments for each of the respective personalized mediacasts stored on a content delivery network to generate a respective personalized mediacast manifest for each of the respective personalized mediacasts.

15. A content delivery system to deliver personalized content, comprising:
at least one communications port communicatively coupleable to receive a broadcast or Webcast from a broadcaster or Webcaster, respectively, the broadcast or Webcast at least including: a plurality of replaceable programming content segments, a plurality of replaceable non-programming content segments, and a plurality of non-replaceable programming content segments;
at least one non-transitory processor readable medium that stores a number of processor-executable instructions;
at least one processor communicably coupled to the at least one communications port and communicably coupled to the non-transitory processor readable medium to execute the processor-executable instructions, which execution causes the at least one processor to:

for each of a plurality of requested personalized mediacasts logically associated with a number of content consumers, select a number of replacement programming content segments based at least in part on at least one content consumer selected content consumer replacement programming selection criterion logically associated with a respective one of the content consumers;

for each of the requested personalized mediacasts, select a number of replacement non-programming content segments based at least in part on a replacement non-programming selection criterion;

generate the personalized mediacast for each of the received requests, each of the personalized mediacasts at least including: the plurality of non-replaceable programming content segments from the broadcaster or Webcaster, the respective selected replacement programming content segments, and the respective selected replacement non-programming content segments;

detects a start of a given non-replaceable programming content segment of the broadcast or Webcast;

determines that a processing of previous content segment to generate a respective one of the personalized mediacasts is not complete; and in response, causes the given non-replaceable programming content segment of the broadcast or Webcast to be buffered to a buffer.

16. The content delivery system of claim 15 wherein the at least one processor receives the requests for personalized mediacasts from the content consumers, at least some of the received requests which include an indication of the respective content consumer programming selection criterion selected by the respective content consumer, the content consumer programming selection criterion indicative of at least one of: a song, a musical artist, a performing artist, a dramatic artist, a musical group, an album, a musical work, a theatric work, a film work, and a television work; and the at least one processor selects the replacement programming content segments for the respective personalized mediacasts based on satisfying both the content consumer programming selection criterion included in the respective received request and a broadcaster or Webcaster programming playlist.

17. The content delivery system of claim 15 wherein the replacement non-programming selection criterion is indicative of at least one of: a market demographic value associated with the respective one of the plurality of content consumers, or a geographic value associated with the respective one of the plurality of content consumers; and the at least one processor selects the replacement non-programming content segments based at least in part on information for the respective content consumer satisfying the respective replacement non-programming selection criterion.

18. The content delivery system of claim 15 wherein the replacement non-programming selection criterion is indicative of at least one of: a market demographic value associated with the replacement non-programming content segment provided by a third party; a geographic value associated with the replacement non-programming content segment provided by a third party; a respective content consumer prior purchase history value associated with the replacement non-programming content segment provided by a third party; a respective content consumer replacement programming content segment value associated with the replacement non-programming content segment provided by a third party; and a respective content consumer self-reported attribute value associated with the replacement non-programming content segment provided by a third party; and the at least one processor selects the replacement non-programming content segments based at least in part on information for the respective content consumer satisfying the respective replacement non-programming selection criterion.

19. The content delivery system of claim 15 wherein the replacement non-programming selection criterion is indicative of at least one of: a prior purchase value associated with the respective one of the plurality of content consumers; an Internet Protocol address associated with the respective one of the plurality of content consumers; a result of a survey of non-programming content segments associated with other content consumers within a delineated area of the respective one of the plurality of content consumers; a result of a survey of programming content segments associated with other content consumers with whom the respective one of the plurality of content consumers has indicated an association; a result of a survey of purchases associated with other content consumers with whom the respective one of the plurality of content consumers has indicated an association; and at least one self-reported value associated with respective one of the plurality of content consumers; and the at least one processor selects the replacement non-programming content segments based at least in part on information for the respective content consumer satisfying the respective replacement non-programming selection criterion.

20. The content delivery system of claim 15 wherein the at least one processor further:

detects a start of another non-replaceable programming content segment of the broadcast or Webcast;

determines that a processing of a previous content segment with respect to the other non-replaceable programming content segment to generate a respective one of the personalized mediacasts is complete; and in response, incorporates the other non-replaceable programming content segment of the broadcast or Webcast into one of the respective personalized mediacasts.

21. The content delivery system of claim 15 wherein the at least one processor further:

determines that the processing of previous content segment to generate the respective one of the personalized mediacasts has completed;

in response, causes delivering the given non-replaceable programming content segment of the broadcast or Webcast from the buffer; and incorporates the given non-replaceable programming content segment of the broadcast or Webcast into one of the respective personalized mediacasts.

22. The content delivery system of claim 21 wherein the at least one processor further:

continues to cause a portion of the given non-replaceable programming content segment of the broadcast or Webcast to be buffered to the buffer while delivering another portion of the given non-replaceable programming content segment of the broadcast or Webcast from the buffer.

23. The content delivery system of claim 15 wherein the at least one non-transitory computer readable storage medium stores the number of replacement programming content segments.

24. The content delivery system of claim 15 wherein the at least one non-transitory computer readable storage medium includes at least one remote data store communicably coupled to the processor via at least one intervening network connection.

25. The content delivery system of claim 15 wherein the at least one non-transitory computer readable storage medium stores the number of replacement non-programming content segments.

* * * * *